United States Patent

Lindner et al.

[11] Patent Number: 6,029,789
[45] Date of Patent: Feb. 29, 2000

[54] ACTUATING DEVICE FOR ACTUATION, ESPECIALLY PNEUMATIC ACTUATION, OF A FRICTION CLUTCH

[75] Inventors: Joachim Lindner, Hambach; Jörg Willert, Schweinfurt; Thomas Otto, Gochsheim, all of Germany

[73] Assignee: Mannesmann Sachs AG, Schweinfurt, Germany

[21] Appl. No.: 09/004,439

[22] Filed: Jan. 8, 1998

[30] Foreign Application Priority Data

Jan. 8, 1997 [DE] Germany .............................. 197 00 336
Apr. 21, 1997 [DE] Germany .............................. 197 16 641

[51] Int. Cl.$^7$ ...................................................... B62K 23/02
[52] U.S. Cl. ..................................... 192/85 CA; 192/91 A
[58] Field of Search ............................. 192/85 R, 85 CA, 192/91 A

[56] References Cited

U.S. PATENT DOCUMENTS

| | | | |
|---|---|---|---|
| 4,796,739 | 1/1989 | Jonner et al. ...................... | 192/85 R X |
| 5,060,776 | 10/1991 | Skog et al. ......................... | 192/85 R X |
| 5,217,097 | 6/1993 | Lasoen ............................... | 192/85 R X |
| 5,273,143 | 12/1993 | Voss et al. ......................... | 192/85 R X |
| 5,311,974 | 5/1994 | Rueb .................................. | 192/85 R X |
| 5,390,497 | 2/1995 | Cottam .............................. | 192/85 R X |
| 5,474,165 | 12/1995 | Doremus ............................ | 192/85 CA |
| 5,538,121 | 7/1996 | Hering ............................... | 192/91 A X |
| 5,577,585 | 11/1996 | Corral ................................ | 192/91 A X |
| 5,678,673 | 10/1997 | Borschert et al. ................. | 192/91 A X |

FOREIGN PATENT DOCUMENTS

| | | |
|---|---|---|
| 33 21 578 | 12/1984 | Germany . |
| 58-118331 | 7/1983 | Japan . |
| 5-60149 | 3/1993 | Japan . |
| 2 141 513 | 12/1984 | United Kingdom . |

*Primary Examiner*—Charles A. Marmor
*Assistant Examiner*—Saul Rodriquez
*Attorney, Agent, or Firm*—Cohen, Pontani, Lieberman & Pavane

[57] ABSTRACT

A actuating device for a friction clutch which is arranged in the drivetrain of a motor vehicle in a housing cover between an internal combustion engine and a transmission. The actuating device includes a release bearing arrangement and a positioning servo arrangement for the release bearing arrangement. The positioning servo arrangement has a pressure medium power cylinder arrangement and a control valve connected with a pressure medium source. The control valve includes a valve arrangement which is switchable between at least two control states depending on an actual quantity representing the axial position of the release bearing arrangement and on a control quantity representing a reference position of the release bearing arrangement. In a first control state, there is a pressure medium connection between the pressure medium power cylinder arrangement and the pressure medium source, and in a second control state there is a pressure medium connection between the pressure medium power cylinder arrangement and a pressure compensation port. The valve arrangement includes two valve elements which are movable relative to one another and relative to a valve housing. The control quantity is represented by the position of a first valve element of the two valve elements and the actual quantity is represented by the position of a second valve element of the two valve elements relative to the valve housing. A differential quantity associated with the actual quantity and control quantity is represented by the position of the two valve elements relative to one another.

82 Claims, 9 Drawing Sheets

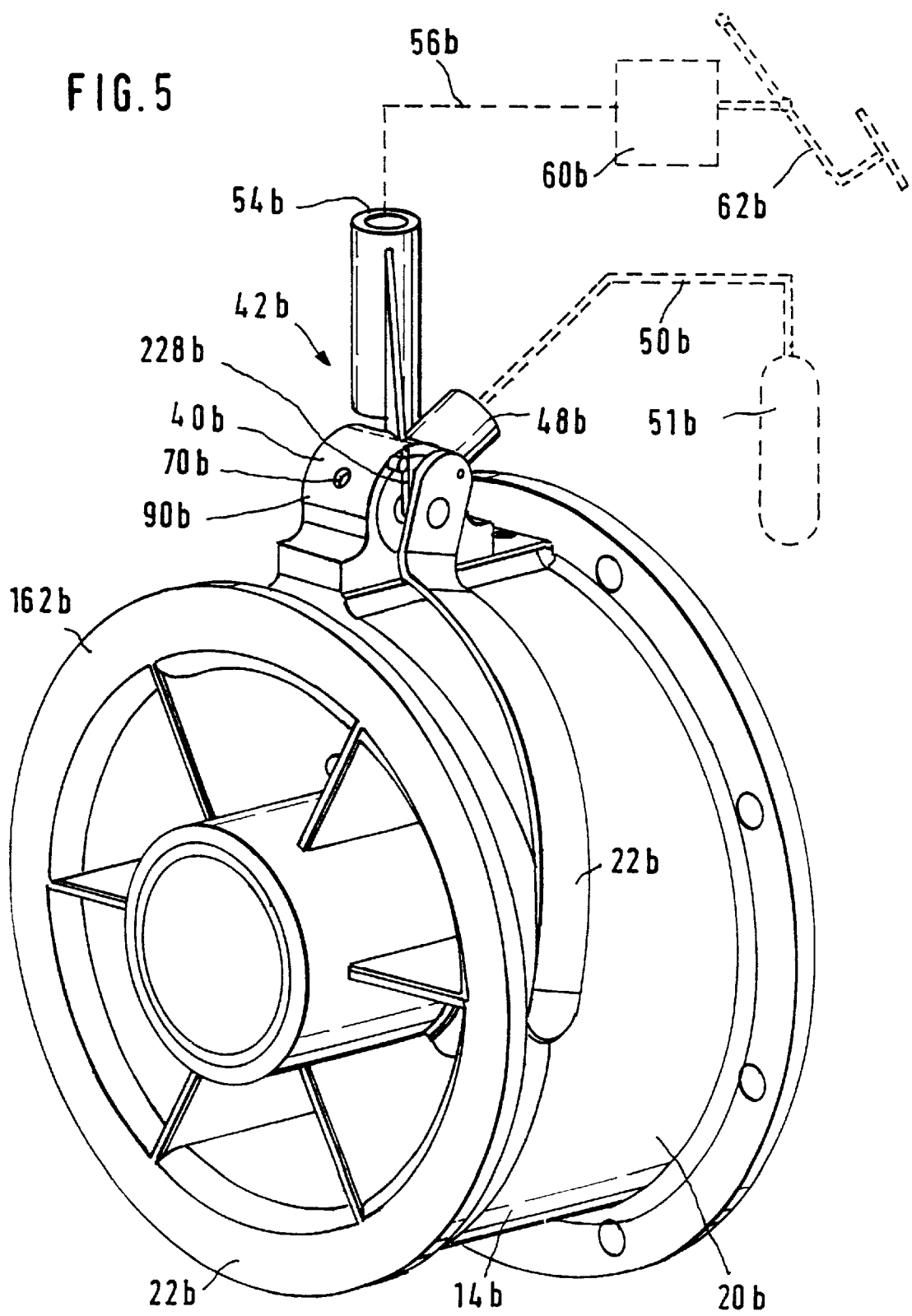

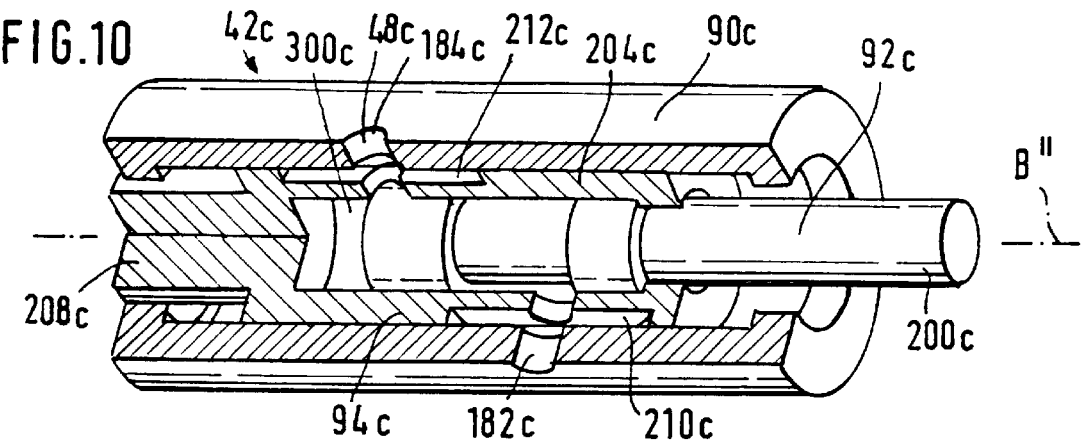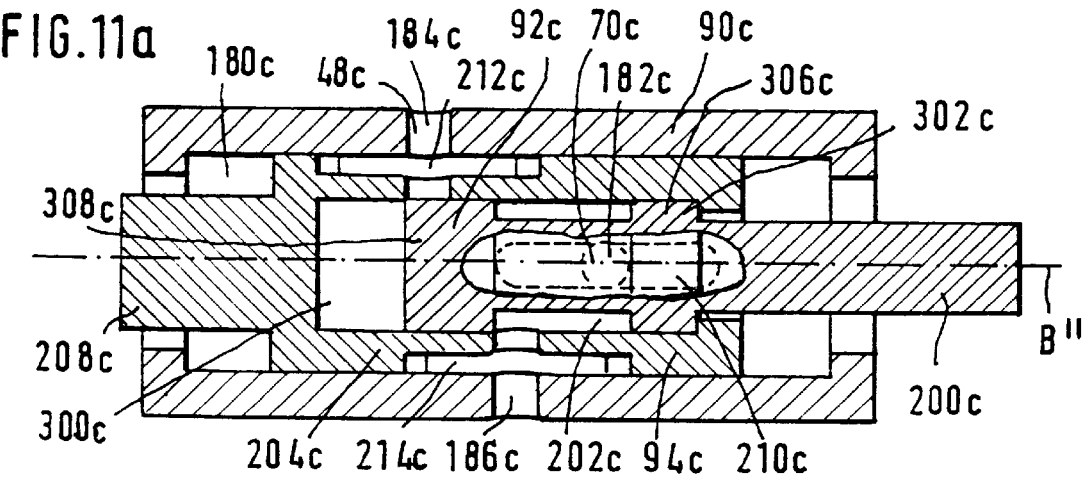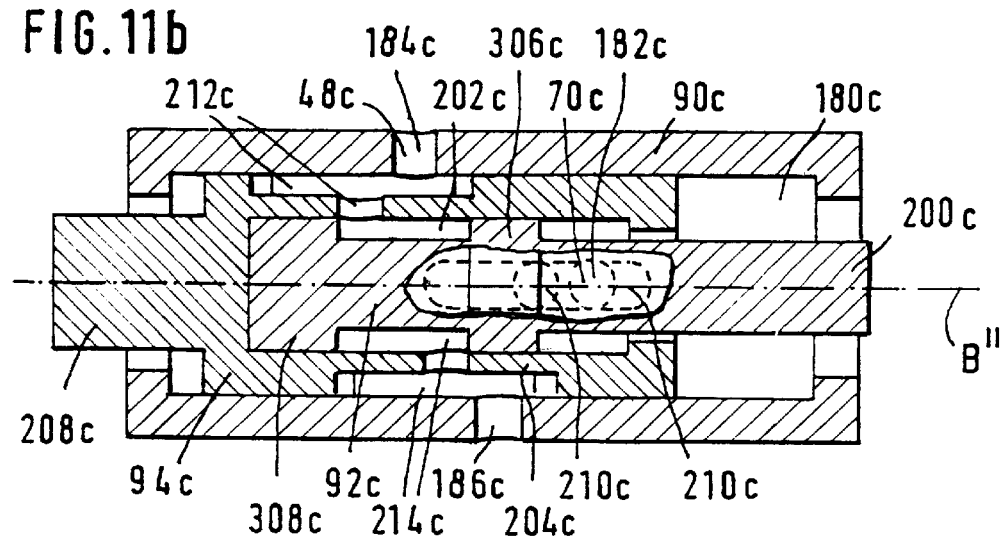

ACTUATING DEVICE FOR ACTUATION, ESPECIALLY PNEUMATIC ACTUATION, OF A FRICTION CLUTCH

BACKGROUND OF THE INVENTION

1. Field of the Invention

The invention is directed to an actuating device for a friction clutch which is arranged in the drivetrain of a motor vehicle, especially of a commercial vehicle, in a housing cover between an internal combustion engine and a transmission. The invention relates further to an actuating device which comprises a release bearing arrangement, which is movable substantially coaxially to the friction clutch for actuating the friction clutch, and a positioning servo arrangement with a pressure medium power cylinder arrangement which acts on the release bearing arrangement and which can be actuated by means of a control valve connected with a pressure medium source depending on a control quantity representing a reference position and depending on an actual quantity representing the axial position of the release bearing arrangement.

2. Description of the Prior Art

An actuating device of this kind is known, for example, from German DE 33 21 578 C2. This known actuating device has a vacuum servo booster or power assist as a positioning servo arrangement. The servo power assist, which is constructed in the manner of a vacuum brake power assist, is constructed integral with a pneumatic power cylinder and integral with a control valve, and is arranged outside of the housing cover. Two work chambers of the pneumatic power cylinder are separated from one another by a piston which is guided so as to be movable axially and a resilient diaphragm. One work chamber, which is constructed as a vacuum chamber, is connected to an intake line system of the internal combustion engine. The other work chamber, which serves as a control chamber, can communicate by means of the control valve either with the vacuum chamber or, via a pressure compensation port, with the atmosphere. The actuation of the vacuum servo power assist is effected by means of a control rod which acts on the valve body of the control valve and which is axially displaceable via a cam driven by en electric motor. As a result, an axial displacement of the control rod occurs, the control valve is switched in such a way that the piston follows the movement of the control rod in a power-assisted manner. By way of a hydraulic master cylinder, the movement of the piston acts on a slave cylinder which is connected with the master cylinder and arranged outside of the housing cover and acts, in turn, on a release fork associated with the release bearing arrangement. An emergency actuation of the clutch is possible when the internal combustion engine is stopped, that is, in the absence of vacuum pressure, in that the control rod can act directly on the piston via the valve body of the control valve.

The control valve has a valve body which cooperates with a resilient valve seat. A connection duct is provided in the valve seat, the connection between the control chamber and the surrounding air being effected via this connection duct, insofar as the valve body is not pressed against the resilient valve seat, in order to close the connection duct through the valve body. A further connection duct connects the control chamber with the vacuum chamber.

Further, a known actuating device of the type mentioned above has a pneumatic force cylinder as a pressure medium power cylinder arrangement. The actuating device is arranged outside of the housing cover as an integral unit comprising the pneumatic power cylinder, a hydraulic slave cylinder and the control valve. The piston of the pneumatic power cylinder is arranged at a rod element forming the piston of the hydraulic slave cylinder, and the rod element is connected with a tappet which extends into the interior of the housing cover and acts at a release fork associated with the release bearing arrangement. A master cylinder which can be actuated by the clutch pedal, and a control unit of the control valve are connected to the hydraulic slave cylinder. The control valve controls the supply of compressed air to the pneumatic power cylinder depending on the hydraulic pressure present at the control input and controls the release of air from the pneumatic power cylinder, respectively, so that a given hydraulic pressure determined by a pressure spring arrangement is adjusted at the control input. The hydraulic slave cylinder serves as a measurement cylinder which detects the position of the rod element and accordingly indirectly detects the position of the release bearing arrangement. When the master cylinder is actuated, forces are exerted directly on the rod element, and accordingly on the release bearing arrangement, via the hydraulic slave cylinder serving as measurement cylinder, in addition to the actuating forces of the pneumatic power cylinder due to the supply of compressed air.

SUMMARY OF THE INVENTION

It is intended to provide an actuating device of the above-mentioned type in which the pressure medium power cylinder arrangement is arranged inside the housing cover. In one embodiment the pressure medium power cylinder arrangement is constructed for exerting a force on the release bearing arrangement, wherein this force is substantially coaxial to the clutch axis. For this purpose, the pressure medium power cylinder arrangement comprises, for example, a pressure medium ring cylinder which is substantially concentric to the coupling axis.

In an arrangement of this kind, it would be possible, in principle, to use a control valve of the type mentioned above with a hydraulic slave cylinder serving as measurement cylinder by which forces are exerted on the release bearing arrangement when the control valve is actuated. However, when using a pressure medium power cylinder arrangement constructed for exerting force on the release bearing arrangement, wherein this force is substantially coaxial to the clutch axis, this would have the disadvantage that tilting moments are exerted on the release bearing arrangement by the measurement cylinder insofar as the measurement cylinder is not also constructed for exerting forces on the release bearing arrangement which are substantially coaxial to the clutch axis, for example, when it is constructed as a measurement ring cylinder which is substantially coaxial to the clutch axis. A measurement ring cylinder of this type would have the disadvantage that, in case of leakage in the hydraulic measurement cylinder, the housing cover would have to be removed from the internal combustion engine in order to exchange the measurement cylinder. On the other hand, if a measurement cylinder arranged laterally to the pressure medium power cylinder arrangement were used, for example, the tilting moments exerted on the release bearing arrangement would necessitate a corresponding increase in mechanical complexity in order to absorb or compensate for these tilting moments.

In contrast, it is the object of the present invention to provide an actuating device of the type mentioned above with a pressure medium power cylinder arrangement arranged inside the housing cover, in which no substantial forces, especially tilting forces, are exerted on the release bearing arrangement (apart from those exerted by means of the pressure medium supplied by the pressure medium power cylinder arrangement) as a result of the control valve (and as a result of a measurement arrangement or the like that may be associated with the control valve).

A further object of the present invention is to provide an actuating device of the type mentioned above that enables simplified servicing (regardless of whether the pressure medium power cylinder arrangement is arranged inside or outside of the housing cover) of the control valve or of the components associated therewith.

Pursuant to these objects, and others which will become apparent hereafter, one aspect of the present invention resides in a control valve that comprises a valve arrangement which is displaceable between a first control state, in which the pressure medium power cylinder arrangement is connected to the pressure medium source, and a second control state in which the pressure medium power cylinder arrangement is connected with a pressure compensation port. This valve arrangement is switchable between the two control states depending on a differential quantity associated with the actual quantity and the control quantity. The valve arrangement comprises two valve elements which are movable relative to one another and relative to a valve housing, and the control quantity is represented by the position of a first valve element of the two valve elements, and the actual quantity is represented by the position of a second valve element of the two valve elements relative to the valve housing. The differential quantity is represented by the position of the two valve elements relative to one another.

The construction of the control valve, according to the invention, with two valve elements, each of whose positions represents a separate quantity determining the control state of the control valve, enables a decoupling of the "actual quantity side" of the positioning servo arrangement from the "control quantity side" of the positioning servo arrangement in such a way that when changing the control quantity of the control quantity side of the positioning servo arrangement no substantial variable forces are exerted on the release bearing arrangement apart from those exerted by the pressure medium supplied by the pressure medium power cylinder arrangement. Accordingly, no considerable tilting moments are exerted on the release bearing arrangement by the control quantity side of the positioning servo arrangement. Mechanical means for absorbing or compensating for tilting forces can accordingly be dispensed with, so that the actuating device, according to the invention, can be manufactured more economically.

Since the actual quantity and the control quantity are represented by the positions of separate valve elements, this enables an uncomplicated coupling of the control valve to a control quantity transmitter unit on the one hand and to an actual quantity transmitter unit on the other hand. The control valve can accordingly be constructed, for example, that it can be exchanged without great effort so as to facilitate maintenance.

The valve arrangement can be adjustable, in dependence on the differential quantity, to a third control state in which the pressure medium power cylinder arrangement is preferably closed so as to be substantially tight against pressure medium. This means that it is connected neither with the pressure medium source nor with the pressure compensation port. A determined position of the valve arrangement is then associated with the third control state. However, the third control state can also be characterized in that the valve arrangement alternately occupies the first control state and the position associated with the second control state, so that the pressure medium power cylinder arrangement is not closed so as to be tight against pressure medium.

The control valve has a first signal connection for receiving a control signal indicating the control quantity, especially from a clutch pedal arrangement, and a second signal connection for receiving an actual value signal indicating the actual quantity from a transmitter element arrangement associated with the release bearing arrangement. The control signal and the actual value signal preferably act directly on precisely one valve element of the two valve elements independently from the respective other signal, i.e., the control signal acts on the first valve element and the actual value signal acts on the second valve element. The fact that each of the signals acts directly on precisely one valve element does not exclude the possibility of the signals acting on the respective valve element via intermediate components. The wording "act directly" serves only to distinguish this from "indirect" action, in particular the action of the control signal on the second valve element via the positioning servo arrangement in such a way that a corresponding switching of the control valve between the control states by means of the pressure medium power cylinder arrangement results in the actual quantity being adjusted in accordance with the given quantity of the control quantity and the position of the second valve element representing the actual quantity consequently also changes.

In particular, the actual value signal can be a hydraulic, pneumatic, mechanical or electrical signal represented by pressure, volume, force, path, angle, current density, or voltage, wherein converter means for converting the actual value signal to the actual quantity are associated with the second signal connection.

The positioning servo arrangement comprises a mechanical position regulating arrangement with a mechanically coupled or mechanically coupleable transmitter element which directly or indirectly detects the position of the release bearing arrangement. In this respect, the transmitter element preferably acts on the second valve element and, in particular, is coupled or coupleable therewith with respect to movement. The second valve element can be substantially rigidly coupled or rigidly coupleable with the release bearing arrangement or with the pressure medium power cylinder arrangement on the side of the release bearing arrangement by means of a coupling element. The coupling element can be integral with the second valve element. However, in another embodiment the second valve element is coupled or coupleable with a coupling element which is substantially rigidly coupled therewith, possibly so as to be integral therewith, and which is pretensioned or pretensionable against the release bearing arrangement or against the pressure medium power cylinder arrangement on the release bearing arrangement side.

The control signal can be a hydraulic, pneumatic, electrical or optical signal represented in particular by a pressure, volume, force, path, angle, current, voltage or light intensity, wherein converter means are associated, if required, with the first signal connection for converting the control signal into the control quantity. The control signal is preferably a pneumatic or hydraulic control signal, most preferably a hydraulic control signal. In this respect, it is suggested that the converter means for converting the pneumatic or hydraulic control signal comprise a piston, in particular a piston which is pretensioned by spring force, which is preferably coupled or coupleable with the first valve element, especially so as to be integral therewith.

In a further embodiment of the invention, the valve arrangement comprises, in addition to the first and second valve elements, an auxiliary valve element which is movable relative to the valve housing and which cooperates with the first and/or second valve element in order to provide at least one of the control states.

The auxiliary valve element has a contact portion or application portion which is associated with the first valve element and which is acted upon by the first valve element for driving the auxiliary valve element and/or for interrupting at least one pressure medium connection inside the control valve, especially for interrupting the pressure medium connection between the pressure medium power cylinder arrangement and the pressure compensation port.

Further, the auxiliary valve element has an application portion which is associated with the second valve element and which is acted upon by the second valve element for driving the auxiliary valve element and/or for interrupting at least one pressure medium connection inside the control valve, especially for interrupting the pressure medium connection between the pressure medium source and the pressure medium power cylinder arrangement and/or for blocking a pressure medium connection which, if required, is possible in principle with respect to construction, between the pressure medium source and the pressure compensation port.

Due to the fact that the auxiliary valve element cooperates in producing or interrupting at least one, preferably a plurality, pressure medium connection inside the control valve. The conditions that must be met in order to produce or interrupt the respective pressure medium connection can be determined in an especially accurate manner and, if required, independently from the rest of the pressure medium connections.

In still another embodiment, pretensioning means are provided, especially pretensioning means acting between the second valve element and the auxiliary valve element, which pretension the auxiliary valve element in the direction of application of the second valve element on the associated application portion of the auxiliary valve element and/or in the direction of application of the first valve element on the associated application portion of the auxiliary valve element, in order to close the pressure medium connection in a basic state of the actuating device in which the clutch is not actuated. The pretensioning of the pretensioning means has to be selected so that its magnitude is precisely sufficient to ensure tightness and, at the same time, to keep the tilting force which might be generated by the pretensioning at a minimum. The first valve element and the second valve element, and possibly the valve housing, can have, in each instance, at least one application portion or engagement portion for limiting the movement range of the two valve elements relative to one another and, if required, for limiting the movement range of at least one of the valve elements relative to the valve housing. A pressure medium connection inside the control valve, especially the pressure medium connection between the pressure medium source and the pressure medium power cylinder arrangement, is preferably produced when the application portions of the first and second valve element which are associated with one another contact one another.

Yet a further embodiment of the invention provides pretensioning means acting between the first valve element and the second valve element, in particular in order to keep the pressure compensation port open in the basic position. The pretensioning of the pretensioning means must be selected so that it is precisely sufficient for overcoming the occurring friction forces and, simultaneously, for keeping the tilting force which may possibly be generated by the pretensioning at a minimum. The tension of the pretensioning means acting between the first valve element and the second valve element is preferably at a maximum when the application portions of the first valve element and the second valve element which are associated with one another contact one another.

According to another embodiment of the actuating device, one of the first valve element and the second valve element, especially the second valve element, has at least one portion that forms a control edge which cooperates with at least three pressure medium openings in the other valve element and in the valve housing. In particular the control edge cooperates with a pressure medium opening in the other valve element, and two pressure medium openings in the valve housing in order to interrupt or produce a first pressure medium connection inside the control valve, especially the pressure medium connection between the pressure medium source and the pressure medium power cylinder arrangement, in at least one relative position of the two valve elements relative to one another during a movement of one valve element relative to the other valve element in one direction. This is accomplished by the control edge moving past at least one of the pressure medium openings, especially the pressure medium opening in the other valve element, and producing or interrupting another pressure medium connection inside the control valve, in particular the pressure medium connection between the pressure compensation port and the pressure medium power cylinder arrangement. In this construction, an auxiliary valve element which cooperates with the first and/or second valve element and which is movable relative to the valve housing is preferably dispensed with.

One of the first valve element and the second valve element, especially the first valve element, can have at least one engagement portion, in particular a pin type engagement portion, which engages in an associated slot-like recess of the other valve element. The recess is limited at both ends by stops for limiting the range of movement of the two valve elements relative to one another.

In a further embodiment, the control valve (independent from the rest of the construction features) occupies the control state connecting the pressure compensation port with the pressure medium power cylinder arrangement in a basic state of the actuating device in which the clutch is not actuated. If the cylinder arrangement in a pressure medium power cylinder arrangement constructed as a pneumatic power cylinder arrangement is vented into the atmosphere via the pressure compensation port, ambient pressure will prevail inside the cylinder arrangement in the basic state of the actuating device. Thus, unwanted pressure changes inside the cylinder arrangement due to external influences (e.g., temperature) are excluded.

The first valve element and second valve element and—insofar as it is provided—the auxiliary valve element can be mounted in a recess of the valve housing so as to be displaceable along a valve axis, wherein the actual quantity and the control quantity are represented by axial positions of the respective valve element. At least one of the elements—first valve element, second valve element and, when provided, auxiliary valve element—can be constructed at least in some areas as a ring element coaxial to the valve axis and can surround at least one other of these valve elements radially outside, at least in some areas.

The recess of the valve housing is preferably an annular recess which has annular cylindrical walls extending coaxially at a radial distance. The recess extends around a tube element which is stationary with respect to the valve housing, preferably so as to form one piece therewith, and which runs coaxial to the valve axis. The tube element has, in the area of its free end, a pressure medium through-opening which is open particularly in the axial direction as part of at least one pressure medium connection within the control valve, especially as part of the pressure medium connection between the pressure medium power cylinder arrangement and the pressure medium source and/or as part of the pressure medium connection between the pressure medium power cylinder arrangement and the pressure compensation port. In this respect, it is suggested that the first valve element has an annular portion which encloses the tube element radially outside at least in some areas, wherein at least one annular sealing element preferably acts between the annular portion and the tube element in a sealing manner.

It is further suggested that at least one annular sealing element acts so as to seal between the radially outer annular cylindrical wall of the annular recess and the first valve element, especially the annular portion.

In a another embodiment, the first valve element has a tubular portion which adjoins the annular portion axially and which encloses the tube element at least in some areas on the radial outside. At least one annular sealing element preferably acts as a seal between the tubular portion and the tube element.

The auxiliary valve element, which is constructed as a ring element, can enclose the first valve element, especially the tubular portion, at least in some areas on the radial outside.

In still a further embodiment, the first valve element has a closure portion which adjoins the tubular portion, extends substantially in the radial direction, and covers the pressure medium through-opening in the free end of the tube element in the axial direction. The first valve element acts with the closure portion on the associated annular, radially inwardly projecting application portion of the auxiliary valve element for driving and/or for interrupting the at least one pressure medium connection. The application portion of the auxiliary valve element can limit a pressure medium through-opening in the radial direction which is part of a pressure medium connection inside the control valve and which, in particular, is associated with the pressure compensation port or is identical with the latter.

With respect to the construction of the first valve element with the closure portion, it is particularly preferable that the first valve element has, in the end region of the tubular portion adjacent to the closure portion, at least one pressure medium through-opening which is open in particular in the radial direction and which is part of at least one pressure medium connection inside the control valve, especially part of the pressure medium connection between the pressure medium power cylinder arrangement and the pressure medium source and/or the pressure medium connection between the pressure medium power cylinder arrangement and the pressure compensation port.

The second valve element, which is constructed as a ring element, can enclose the first valve element and/or, where provided, the auxiliary valve element radially outside, at least in some areas. At least one annular sealing element is provided to act in a sealing manner between the second valve element and the auxiliary valve element.

Further, at least one annular sealing element is provided to act in a sealing manner between the radial outer annular cylindrical wall of the annular recess and the second valve element.

A pressure medium channel, especially a pressure medium annular channel, is formed radially between the tubular portion and the auxiliary valve element and/or radially between the second valve element and an annular cylindrical wall of the valve housing which defines the recess radially outside. The pressure medium channel is part of a pressure medium connection inside the control valve, especially part of the pressure medium connection between the pressure medium source and the pressure medium power cylinder arrangement. In this respect, it is preferable that a pressure medium connection is provided between the two pressure medium channels. The pressure medium connection can be interrupted in that the second valve element acts on the application portion of the auxiliary valve element associated therewith. The connection comprises at least one pressure medium through-opening which is open in the radial direction in the second valve element and/or an annular space which is defined by the tubular portion, the auxiliary valve element or the second valve element.

With respect to the coupling of the pressure medium source and/or the coupling of a control signal transmitter to the control valve, it is suggested that a valve connection connected with the pressure medium source and/or a valve connection connected with the control signal transmitter comprise(s) a bore hole in the valve housing which opens into the recess and is radially directed. The bore hole of the valve connection connected with the control signal transmitter preferably opens into the region of a recess base in the recess, which recess base closes the recess on one axial side, wherein the annular portion of the first valve element serving as a piston of the converter means is located opposite from the recess base. The bore hole of the valve connection connected with the pressure medium source preferably opens into a recess end region in the recess, which recess end region adjoins a recess opening which opens in the axial direction.

With respect to the coupling of the pressure medium power cylinder arrangement to the control valve, the coupling includes a valve connection connected with the pressure medium power cylinder arrangement. The valve connection comprises a first bore hole which opens into the recess and, in particular, extends through the tube element, and preferably a second bore hole which is connected to the first bore hole and extends in the recess base.

According to a further embodiment of the actuating device according to the invention, the valve elements, particularly the first and second valve element, are supported in a recess of the valve housing so as to be rotatable about the valve axis. The actual quantity and the control quantity are represented by rotational positions of the respective valve element.

One of the first valve element and the second valve element, especially the second valve element, has an annular portion coaxial to the valve axis which encloses the other valve element of the two valve elements radially on the outside, at least in some areas. In this respect, it is particularly preferred that the annular portion of the one valve element, which annular portion is enclosed radially outside by an inner circumferential surface of the valve housing defining the recess, has at least two openings or apertures which extend in the circumferential direction, are offset relative to one another in the circumferential direction, are separated from one another by a respective portion of the annular portion, and open inward radially and outward radially. At least two bore holes which open into the recess and are in particular radially directed are provided in the valve housing. The outlet openings of the bore holes are offset relative to one another in the circumferential direction and, in at least one rotational position of the one valve element, cover another of the apertures at least partially. At least one connection channel, especially a through-bore hole, is provided in the other valve element, wherein this connection channel is open toward two of the apertures at least in one relative rotational position of the two valve elements relative to one another, especially in that the two outlet openings of the through-bore hole are at least partially covered by the respective other aperture.

In this respect, in still a further embodiment exactly three bore holes, exactly three apertures and exactly one connection channel, especially a radially extending through-bore hole, are provided. A pressure medium connection is produced between the pressure medium source and the pressure medium power cylinder arrangement in at least one rotational position area of the two valve elements relative to one another and relative to the valve housing via two of the bore holes, two of the apertures and the connection channel. A pressure medium connection is produced between the pressure medium power cylinder arrangement and the pressure compensation port in at least one other rotational position area of the two valve elements relative to one another and relative to the valve housing via two of the bore holes, two of the apertures and the connection channel.

The portions of the annular portion separating the apertures from one another are preferably dimensioned so that in at least one relative rotational position of the two valve elements relative to one another and/or in at least one rotational position of one valve element relative to the valve housing, at least one channel opening, especially an outlet opening of the through-bore hole in the other valve element and/or at least one of the outlet openings of the bore holes in the valve housing, are/is closed by a respective portion of the annular portion, which portion forms a control edge.

As a result of the latter steps mentioned above, it can be achieved in a simple manner that no pressure medium connection is produced between the pressure medium power cylinder arrangement and the pressure medium source or between the pressure medium power cylinder arrangement and the pressure compensation port in at least one rotational position of the two valve elements relative to one another and relative to the valve housing. Also, without an additional auxiliary valve element which is movable relative to the housing, three control valve states can accordingly be realized by means of the first valve element and the second valve element, namely: 1) pressure medium connection between the pressure medium source and the pressure medium power cylinder arrangement; 2) pressure medium connection between the pressure medium power cylinder arrangement and the pressure compensation port; and 3) closure of the pressure medium power cylinder arrangement so as to be substantially tight against pressure medium.

The outlet openings of the three bore holes in the valve housing are preferably arranged at a distance from one another at equal circumferential angles and preferably cover a circumferential angular area of equal magnitude. In a corresponding manner, it is preferable for the three apertures in the annular portion of one valve element that each of these apertures covers a circumferential angular region of the same magnitude and that the apertures are arranged at a distance from one another at identical circumferential angles. The outlet openings of the three bore holes and, in a corresponding manner, the three apertures are preferably substantially not offset relative to one another in the axial direction.

Of the three bore holes, one bore hole associated with the pressure compensation port, one bore hole associated with the pressure medium source and one bore hole associated with the pressure medium power cylinder arrangement succeed one another in a given circumferential direction. In the basic state of the actuating device, an outlet opening of the through-bore hole in the first valve element is located approximately opposite to the bore hole associated with the pressure compensation port. A portion of the annular portion of the second valve element, which portion forms a control edge, is offset in the circumferential direction relative to the bore hole associated with the pressure compensation port, but is closely adjacent thereto. In order to actuate the clutch the first valve element is rotatable in the circumferential direction relative to the rotational position of the basic state, especially by a maximum of approximately up to one rotational position in which the outlet opening of the through-bore hole is located approximately opposite to the bore hole associated with the pressure medium source.

The recess receiving the valve elements can be constructed as a through-bore hole in the valve housing, which through-bore hole preferably extends transverse to the movement direction of the release bearing arrangement. The first valve element is accessible at one end of the through-bore hole and, in particular, projects out at this end, and the second valve element is accessible, in particular projects out, at the other end of the through-bore hole. In this respect, in another embodiment an end portion of the second valve element projecting from the through-bore hole in the valve housing has a rigidly coupled yoke as a coupling element which acts on the release bearing arrangement or on the release bearing arrangement side of the pressure medium power cylinder arrangement, especially by means of a spring arrangement acting on the yoke and on the valve housing. The spring arrangement preferably comprises a leg spring which is arranged about the end portion, is pretensioned against the latter, or is coupled with the latter in a positive engagement (for example, by means of an elongated hole in which an engagement portion of the yoke engages), so that the yoke is compulsorily carried along. A linear movement of the release bearing arrangement or of the pressure medium power cylinder arrangement on the release bearing arrangement side can then be transformed into a rotational movement of the second valve element via the yoke.

Insofar as converter means are provided for converting a pneumatic or hydraulic control signal, the piston of the converter means which is pretensioned by a spring can be part of a cylinder-piston arrangement which is separate from the valve elements. The piston is preferably movable in a direction substantially transverse to the valve axis. A linear movement of the piston can be transformed into a rotational movement of the first valve element via a coupling arrangement, especially a toggle lever arrangement, acting on the first valve element.

In order to achieve a high operating reliability of the control valve, surface portions of the valve housing, of the first valve element and of the second valve element, which surface portions contact one another, can be constructed as sealing surfaces and/or sliding surfaces, and/or sealing elements can act therebetween so as to seal.

The above-mentioned embodiment of the control valve with valve elements which are mounted in a recess of the valve housing so as to be rotatable about a valve axis can easily also be transferred to a control valve with valve elements which are mounted in a recess of the valve housing so as to be displaceable along a valve axis.

It is true, in general, that the release direction of the pressure medium power cylinder arrangement and the release direction of the friction clutch can be oriented in any optional manner relative to one another. This is true only when the pressure medium power cylinder arrangement is arranged outside of the housing cover and is arranged, for example, at the transmission housing. However, it is often advisable, especially when the pressure medium power cylinder arrangement is arranged inside the housing cover, that the release direction of the pressure medium power cylinder arrangement and the release direction of the friction clutch are substantially parallel to one another, wherein the clutch axis and the axis of the power cylinder arrangement substantially coincide.

In principle, the valve axis and the axis of the power cylinder arrangement can be oriented in any optional manner relative to one another and need have no point in common. However, it is preferable that the valve axis and the axis of the power cylinder arrangement are substantially parallel to one another or are substantially orthogonal to one another in projection on a plane that is substantially parallel to both axes.

The steps and preferred constructions of the control valve and valve arrangement described above, whether the valve elements are displaceable along the valve axis or whether the valve elements are rotatable about the valve axis, contribute, each in itself as well as in combination, to the compactness of the control valve construction, to a highly reliable operation, and to economical manufacture. The control valve can be arranged completely within the housing cover or at least partly inside the housing cover and can preferably be accessed, especially disassembled, from the outside while the housing cover is connected with the internal combustion engine and transmission. The actuating device can then be serviced easily and, if need be, repaired without needing to detach the housing cover, which is generally formed by a portion of a transmission housing, from the internal combustion engine. The control valve can be constructed integral with the pressure medium power cylinder arrangement, but it is preferable that the control valve is arranged at the pressure medium power cylinder arrangement as a separate constructional unit, in particular so as to be detachable.

With respect to particularly easy maintenance, it is suggested in a particularly advantageous manner that a control valve constructional unit comprising the control valve is offset, in a radial direction with respect to the axis of the power cylinder arrangement, relative to a power cylinder constructional unit comprising the pressure medium power cylinder arrangement and that it is detachably arranged at a radial outer portion of the power cylinder constructional unit. In this respect, it is particularly advantageous when the control valve constructional unit can be removed substantially in the radial direction from the power cylinder constructional unit after undoing any fastening means and/or coupling means between the two constructional units, these latter preferably being accessible from at least one radial direction substantially corresponding to the radial direction. The resulting ease of maintenance is noticeable whether the control valves are arranged inside or outside of the housing cover.

The pressure medium can be a pneumatic or hydraulic pressure medium. In a particularly preferable manner, the pressure medium is a pneumatic pressure medium, wherein the pressure medium source is preferably an overpressure source supplying a pressure higher than the ambient or atmospheric pressure.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 3–4 show, in FIGS. 3a, 3b, 4a and 4b, a section through the control valve and a portion of the pressure medium ring cylinder, especially of a pneumatic ring cylinder, of the pressure medium power cylinder arrangement with the control valve of FIG. 2.

FIG. 5 shows a perspective view of a pressure medium power cylinder arrangement with the control valve of another embodiment for an actuating device according to the invention, which control valve is flanged to the pressure medium power cylinder arrangement;

FIG. 10 shows a perspective view in partial section of another embodiment of the control valve, according to the invention, which corresponds, with respect to its basic operation, to the control valve of the embodiment in FIGS. 5 to 7;

FIG. 11 shows, in FIG. 11a, a section through the control valve of FIG. 10 which only partially corresponds to the section shown therein in a basic state position without clutch actuation, and, in FIG. 11b, the section in an actuating position for clutch actuation.

DETAILED DESCRIPTION OF THE PREFERRED EMBODIMENTS

Figure 1:
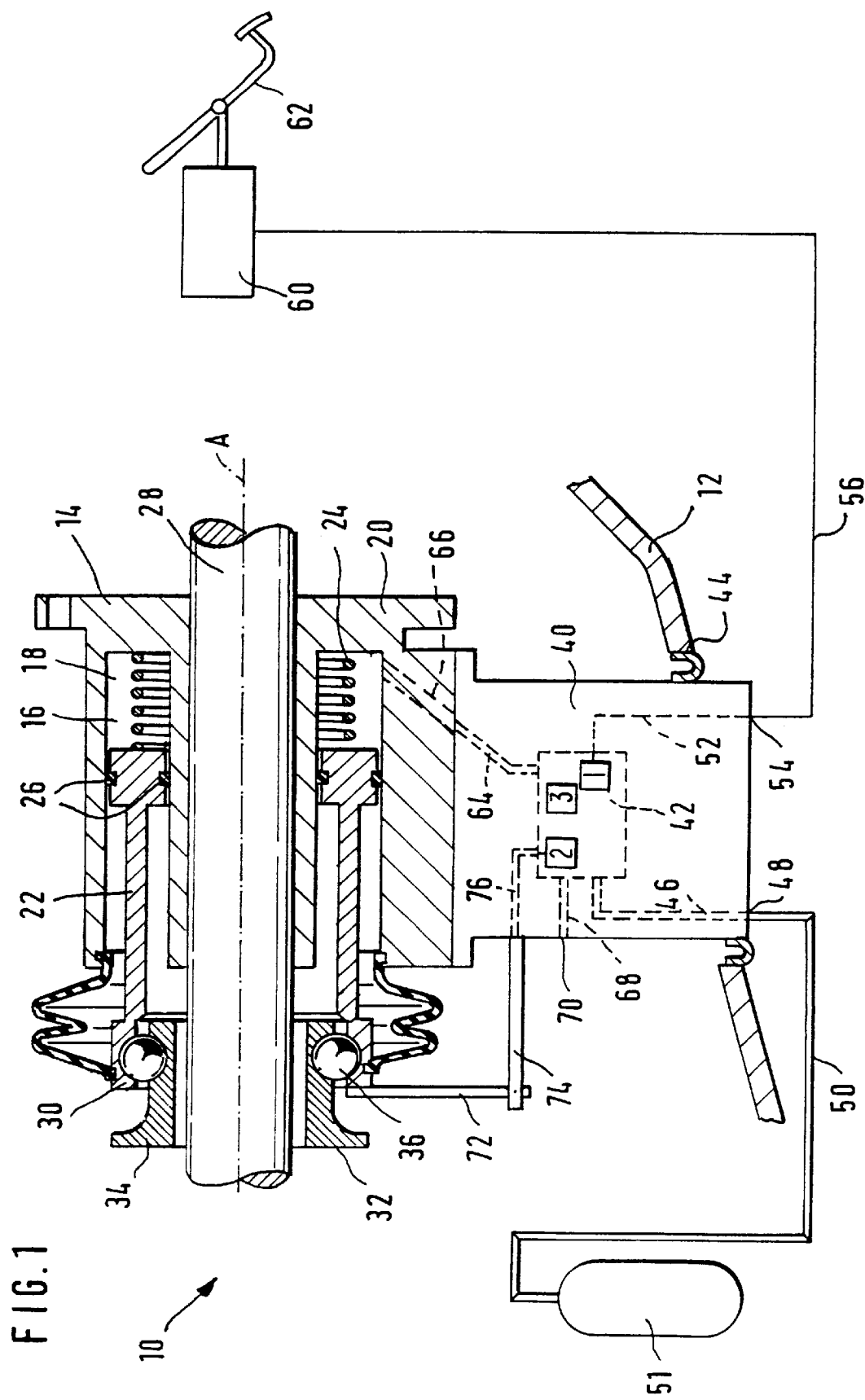
FIG. 1 is a schematic view in partial section of an actuating device, according to the invention, with a pressure medium power cylinder arrangement in the form of a pressure medium ring cylinder, especially a pneumatic ring cylinder.

FIG. 1 shows schematically an actuating device 10, according to the invention, for a friction clutch, in this instance a pressed clutch, arranged in the drivetrain of a motor vehicle between an internal combustion engine and a transmission in a housing cover 12. The actuating device 10 comprises a pressure medium power cylinder arrangement 14 configured as a constructional unit, in this case a pneumatic power cylinder arrangement, which will be referred to hereinafter as an actuating cylinder constructional unit. The actuating cylinder constructional unit 14 comprises a pressure medium ring cylinder, in this case a pneumatic ring cylinder 16, which is formed of an annular cylindrical recess 18 in a stationary body part 20 and a pneumatic ring piston element 22. The pneumatic ring piston element 22 is pretensioned by spring means 24 in the direction of the clutch (toward the left in FIG. 1), not shown, and carries sealing rings 26 for sealing the ring cylinder space of the pneumatic ring cylinder 16.

The pneumatic ring cylinder 16 and the pneumatic ring piston element 22 are arranged coaxial to a clutch axis A. The stationary body part 20 has an axial bore hole through which the transmission input shaft 28 extends coaxial to the clutch axis A.

An annular portion of the pneumatic ring piston element 22 at the end of the ring piston element on the clutch side forms a release ring 30 of a release bearing arrangement 32 which further comprises a release ring 34, which is rotatable relative to the release ring 30 and rotates along with the clutch, and a ball bearing 36 which enables relative rotation between the two release rings 30, 34. The release bearing arrangement 32 acts on the clutch in a known manner, especially via diaphragm spring tongues, when the actuating device 10 is actuated in order to release the clutch for interrupting the flow of power between the transmission and the internal combustion engine.

The actuating cylinder constructional unit 14 includes a control valve constructional unit 40 which is detachably fastened to the actuating cylinder constructional unit 14 and which comprises a control valve 42 which is shown only schematically in FIG. 1. The control valve constructional unit 40 is arranged so that it projects through an associated opening 44 in the housing cover 12 over the outer side of the cover and can be disassembled when the housing cover 12 is connected with the internal combustion engine and the transmission.

The control valve 42 is connected via a pneumatic line 46 inside the control valve constructional unit 40 via a pneumatic connection 48 to the portion of the control valve constructional unit 40 projecting over the outside of the housing cover 12 and, via another pneumatic line 50, with a pneumatic source 51. Further, the control valve 42 is connected via a line 52 inside the control valve constructional unit 40, a connection 54 at the portion of the control valve constructional unit 40 projecting over the outer side of the housing cover 12, and, via another line 56, with a control signal transmitter unit 60. In the illustrated embodiment, the control signal transmitter unit 60 is a clutch pedal arrangement with a clutch pedal 62 which is designed to transmit a control signal in the form of a hydraulic signal via the line 56, the connection 54, and the line 52 to the control valve 42. The lines 52, 56 are consequently hydraulic lines which communicate via the connection 54 constructed as a hydraulic connection.

The control valve 42 is further connected with the ring cylinder space 18 of the pneumatic ring cylinder 16 via a pneumatic line 64 inside the control valve constructional unit 40 and a pneumatic line 66 inside the actuating cylinder constructional unit 14. Further, the control valve 42 is connected with a pressure compensation port 70 in the surface of the control valve constructional unit 40 on the clutch side via a pneumatic line 68 inside the control valve constructional unit 40.

The instantaneous axial position of the release bearing arrangement 32 is supplied to the control valve 42 via mechanical coupling elements 72, 74 in the form of a mechanical actual value signal representing a distance or path as is shown schematically by the connection 76 in dashed lines inside the control valve constructional unit 40. For this purpose, the rod type coupling element 74 projecting out of the control valve constructional unit 40 is coupled, with respect to movement, with one 2 of the three valve elements. The three valve elements of the valve arrangement are displaceable parallel to the clutch axis A in the control valve constructional unit 40. The first valve element 1 of the three valve elements is associated with the control signal transmitter unit 60, a second valve element 2 (already mentioned) of the three valve elements is associated with the release bearing arrangement 32 and is coupled with the latter with respect to axial movement via the coupling elements 72, 74, and a third valve element 3 of the three valve elements, referred to hereinafter as an auxiliary valve element, serves, together with the first valve element and the second valve element, to realize various control states of the control valve 42. For a more precise description of the construction of the control valve 42, reference is had to the embodiment shown in FIGS. 2 to 4, whose control valve 42a corresponds to the control valve 42 shown in FIG. 1 with respect to function. However, the control valve 42 could also easily be a control valve with only two movable, especially rotatable, valve elements. Reference is had in this respect to the embodiment shown in FIGS. 5 to 9, whose valve element 42b can be used with slight modifications with respect to the coupling of a valve element to the release bearing arrangement 32 in the embodiment example shown in FIG. 1.

The control valve 42 (or 42a or 42b) switches between three control states depending on the control signal that is supplied by the control signal transmitter unit 60 and that gives a reference axial position of the release bearing arrangement 32 and on the actual value signal giving the instantaneous axial position of the release bearing arrangement 32. In a first control state, a pneumatic connection is produced between the pneumatic ring cylinder 16 and the pneumatic source 51, so that pneumatic medium, in this case compressed air, is supplied to the pneumatic ring cylinder 16 from the pneumatic source 51, and the pneumatic ring piston element 22 correspondingly moves out of the recess in the direction of the clutch. In a second control state of the control valve 42, a pneumatic connection is produced between the pneumatic ring cylinder 16 and the pressure compensation port 70 via the control valve 42, so that the moved out pneumatic ring piston element 22 moves into the recess 18 again by means of the pressure force of the main spring of the clutch, e.g., a diaphragm spring or the like, wherein the compressed air in the ring cylinder space 18 of the pneumatic ring cylinder 16 flows out of the pressure compensation port 70. In a third control state, the ring cylinder space 18 of the pneumatic ring cylinder 16 is substantially closed so as to be pneumatically tight, so that the pneumatic ring piston element 22 retains its instantaneous axial position.

The control valve 42, with its valve elements, the pressure medium power cylinder arrangement 14, the coupling element 72 constituting a transmitter element for the actual value signal, and the coupling element 74, forms a mechanical position regulating arrangement which, by means of corresponding switching between the three control states, adjusts the axial position of the release bearing arrangement 32 to the reference position provided by the control signal of the control signal transmitter unit 60. For this purpose, the instantaneous position of the release bearing arrangement 42, as an actual quantity, is represented by the position of the second valve element, and the reference position of the release bearing arrangement, as a control quantity, is represented by the position of the first valve element. Associated with the actual quantity and the control quantity is a differential quantity which is represented by the position of the first and second valve elements relative to one another and assumes the value of zero when the actual axial position of the release bearing arrangement 32 corresponds to the reference position.

Two further embodiments of the actuating device according to the invention, or of individual components of actuating devices according to the invention, are described in the following. In the description of the respective embodiment, the same reference numbers as those used in the embodiments already described are used for identically acting or analogous components. The following description will be limited to differences compared with the embodiments already described, wherein, for the rest, reference is had expressly to the preceding description of the other embodiment. In order to distinguish the embodiments, the reference numbers used in the two embodiments described hereinafter are identified by "a" for the embodiment in FIGS. 2 to 4 and by "b" for the embodiment in FIGS. 5 to 9.

Figure 2:
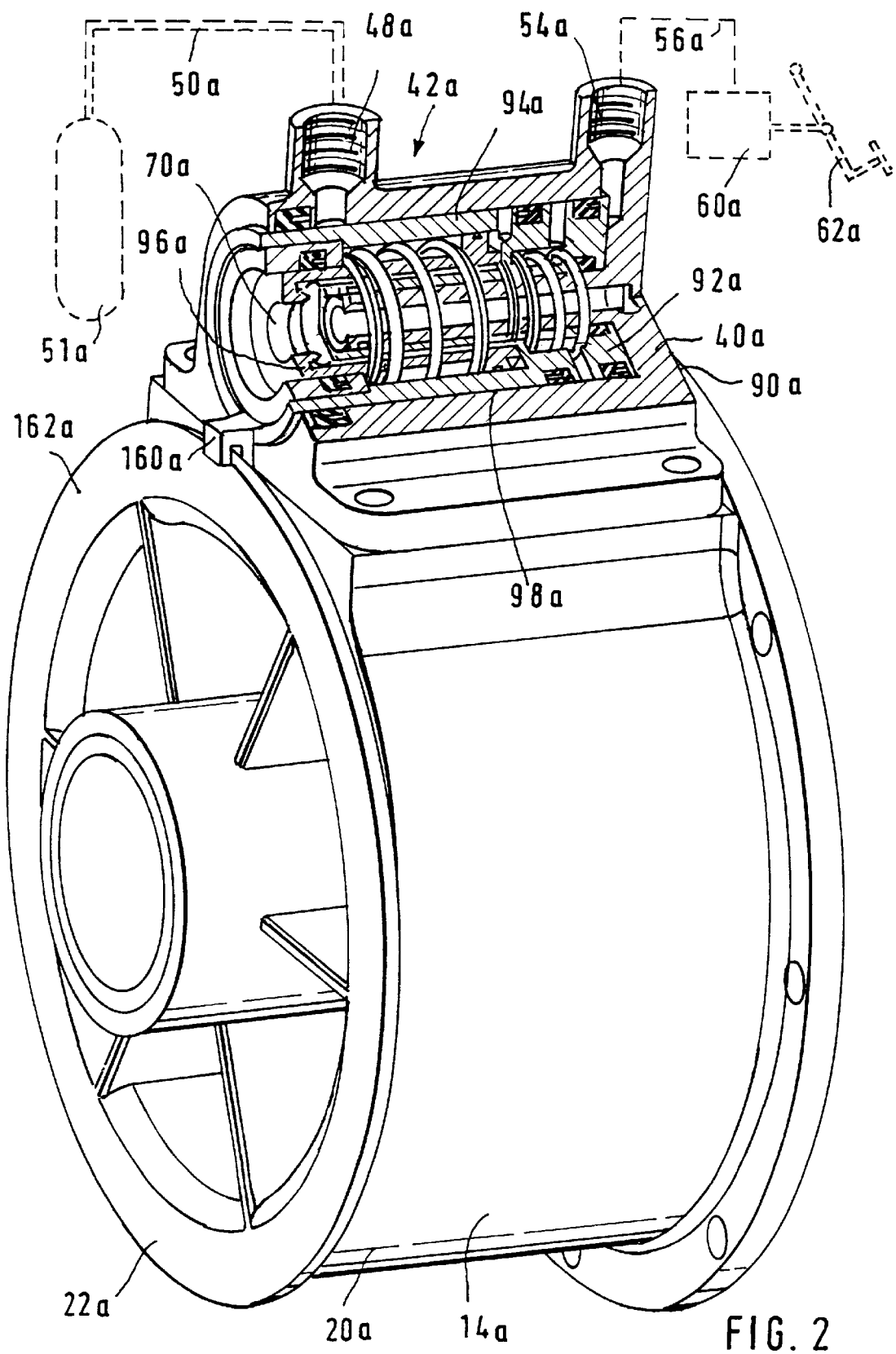
FIG. 2 is a perspective view in partial section of a pressure medium power cylinder arrangement with a control valve of another embodiment of the actuating device, according to the invention, which control valve is flanged thereto, this actuating device corresponds to the actuating device, in function of FIG. 1.

FIG. 2 shows an actuating cylinder constructional unit 14 of an actuating device, according to the invention, which likewise comprises a pneumatic ring cylinder 16a with a pneumatic ring piston element 22a. The cylinder space of the pneumatic ring cylinder 16a is sealed by at least one sealing ring 27a which acts between the pneumatic ring piston element 22a and the body part 20a of the actuating cylinder constructional unit 14a. The control valve constructional unit 40a is detachably flanged to the actuating cylinder constructional unit 14a. The control valve constructional unit 40a comprises the control valve 42a with a valve housing 90a in which, as in the embodiment shown in FIG. 1, three valve elements, namely a first valve element 92a, a second valve element 94a and a third or auxiliary valve element 96a, are mounted so as to be displaceable along a valve axis B parallel to the clutch axis A in an annular recess 98a of the valve housing 90a. The control valve 42a has the pneumatic connection 48a to which the pneumatic source 51a is connected via the pneumatic line 50a. Further, the control valve 42a has the hydraulic connection 54a to which the clutch pedal arrangement 60a is connected via the hydraulic line 56a.

The hydraulic connection 54a comprises a bore hole 100a which opens into the annular recess 98a in the region of a recess base 102a defining the annular recess 98a on the side remote of the clutch. The pneumatic connection 48a has a bore hole 104a which opens into the annular recess 98a in the end region of the recess 98a on the clutch side, which end region is open toward the clutch.

The annular recess 98a, which is defined radially outside and radially inside by annular cylindrical walls of the valve housing 90a which extend coaxially at a distance, radially extends around a tube element 106a which forms one part with the valve housing 90a, is coaxial to the valve axis B, and extends from the recess base 102a in the direction of the clutch. The tube element 106a does not extend in the direction of the clutch as far as the rest of the valve housing 90a, so that a cylindrical recess portion, which is defined radially outside, but not radially inside, and which is considered for the sake of simplicity as part of the recess 98a referred to as the annular recess, adjoins a strictly annular cylindrical recess portion of the annular recess 98a in the direction of the clutch, which recess portion is thus defined radially inside and radially outside.

An axial bore hole 108a, which is open in the direction of the clutch and accordingly toward the annular recess 98a, extends through the tube element 106a. A bore hole 110a in the recess base 102a adjoins the bore hole 108a, and a bore hole 112a in the actuating cylinder constructional unit 14a adjoins bore hole 110a. The bore hole 112a opens into the cylindrical interior of the pneumatic ring cylinder 16a of the actuating cylinder constructional unit 14a. A pneumatic connection is producible between the annular recess 98a and the cylinder space of the pneumatic ring cylinder 16a via the above-mentioned bore holes.

The strictly annular cylindrical portion of the annular recess 98a and the first valve element 92a form a hydraulic slave cylinder; for this purpose, an end portion of the first valve element 92a remote of the clutch is constructed as an annular cylindrical hydraulic piston portion 114a. The hydraulic piston portion 114a is guided so as to be displaceable in a tight manner via two sealing rings 116a, 118a in the strictly annular cylindrical portion of the annular recess 98a.

Figure 3A:
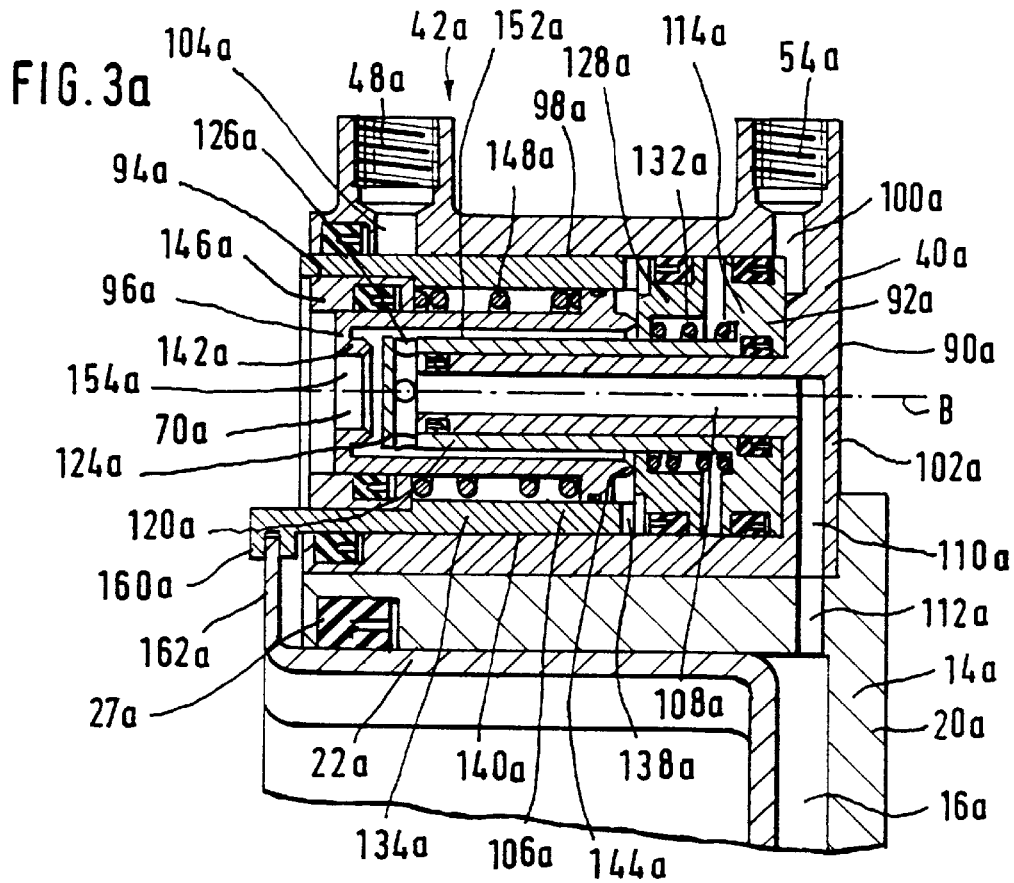
FIG. 3a shows the control valve and the pressure medium power cylinder arrangement in a basic state of the actuating device without clutch actuation.

When the clutch pedal arrangement 60a is actuated, the first valve element 92a is displaced in the direction of the clutch from the axial position corresponding to FIG. 3a by means of the hydraulic medium, in particular hydraulic oil, flowing into the cylinder space of the hydraulic slave cylinder and acting on the hydraulic piston portion 140a, wherein the axial position of the first valve element 92a that is then adjusted provides the reference position of the release bearing arrangement 32, not shown in FIGS. 2 to 4, that is, the control quantity.

The first valve element 92a has a tubular portion 120a which adjoins the hydraulic piston portion 114a in the direction of the clutch and which encloses the tube element 106a radially outward and is tightly guided by means of a sealing ring 122a in an annular groove near the end of the tube element 106a on the clutch side. In the position of the first valve element 92a which is farthest from the clutch, shown in FIG. 3a (the hydraulic piston portion 114a abuts at the recess base 102a or is immediately adjacent thereto), the tubular portion 120a projects slightly over the tube element 106a in the direction of the clutch. The tubular portion 120a ends in an end portion 124a which extends in the radial direction and which covers the interior of the tubular portion 120a and accordingly the tube element 106a in the axial direction and is referred to hereinafter as a closure portion 124a by reason of its operation which will be discussed more fully. In the part of the tubular portion 120a projecting over the tube element 106a in the position in FIG. 3a, tour bore holes 126a extending in the radial direction are provided, which produce a connection between the interior of the tubular portion 120a and the region of the annular recess 98a on the radial outside of the tubular portion 120a and accordingly produce a connection between the cylinder space of the pneumatic ring cylinder 16a and the above-mentioned annular recess portion radially outside of the tubular portion 120a (the second valve element 94a and the auxiliary valve element 96a are still not taken into account in these remarks).

The second valve element 94a which is likewise annularly constructed encloses the tubular portion 120a of the annular first valve element 92a on the radial outside. An annular end portion 128a remote of the clutch serves as a stop portion, wherein the first valve element 92a can stop against annular end portion 128a with the side of the hydraulic piston portion 114a near the clutch as a result of a clutch pedal actuation (compare FIGS. 4a and 4b), so that a limiting of the axial displacement area of the first valve element 92a is achieved in the direction of the clutch, wherein this axial displacement area varies with the axial position of the second valve element 94a. The end portion 128a has a sealing ring 130a in an annular recess, the end portion 128a being guided through this sealing ring 130a so as to be displaceable in a pneumatically tight, sealing manner at the radial outer annular wall of the annular recess 98a. A helical pressure spring 132a extending around the tubular portion 120a of the first valve element 92a is provided between the end portion 128a of the second valve element 94a and the hydraulic piston portion 114a of the first valve element 92a. The helical pressure spring 132a is compressed in the position of the valve elements corresponding to FIG. 3a, in which the end portion 128a and the hydraulic piston portion 114a do not abut and to an even greater extent when the hydraulic piston portion 114a abuts at the end portion 128a. Thus, the pressure spring 132a acts to increase the axial distance between the hydraulic piston 114a and the end portion 128a relative to the distance in FIG. 3a and even more so compared to the distance in FIG. 3b and FIGS. 4a and 4b.

Adjoining the end portion 128a of the second valve element 94a in the direction of the clutch is an annular or tubular portion 134a of the second valve element 94a which by reason of its function in contributing to the guidance of the compressed air inside the control valve, which will be made clearer in the following, will be referred to hereinafter as guide portion 134a. In the position of the second valve element 94a corresponding to FIG. 3a, in which it occupies its position farthest from the clutch (that is, it penetrates to the maximum extent into the annular recess 98a), the guide portion 134a projects to an insignificant extent from the annular recess 98a over the valve housing 90a in the direction of the coupling.

An annular recess for a sealing ring 136a is provided radially outwardly in the annular wall of the valve housing 90a defining the annular recess 98a. The annular recess and accordingly the sealing ring 136a are offset in the direction of the clutch relative to the bore hole 104a which serves for supplying the pneumatic medium. The sealing ring 136a acts to guide the guide portion in the annular recess 98a in a pneumatically tight manner. Since there is a certain, not insubstantial radial distance between the radial outer circumference of the guide portion 134a and the annular wall of the valve housing 90a defining the annular recess 98a radially outside, an annular space 140a is formed between the above-mentioned radial outer radial circumferential surface of the guide portion 134a and the above-mentioned annular wall of the valve housing 90a. This annular space is defined axially in the direction of the clutch by the sealing ring 136a (see FIG. 3b) and axially in the direction of the recess base 102a by the sealing ring 130a (compare FIG. 3b). The bore hole 104a opens into this annular space 140a which is variable with respect to its axial extension due to the movability of the second valve element 94a.

A plurality of through-bore holes 138a, which open into the above-mentioned annular space 140a and produce a connection between the annular space 140a and the region of the annular recess 98a radially inside the guide portion 134a and axially on the clutch side of the end portion 128a, are provided in the guide portion 134a of the second valve element in the area of transition to the end portion 128a, but still on the clutch side of the sealing ring 130a. Two such through-bore holes 138a can be seen in FIGS. 3 and 4. A connection is produced via these through-bore holes 138a, insofar as the auxiliary valve element 96a is not taken into account, between the pneumatic source 51a and the cylinder space of the pneumatic ring cylinder 16a, namely via the pneumatic line 50a, the pneumatic connection 48a, the bore hole 104a, the annular space 140a formed inside the annular recess 98a between the second valve element 94a and the valve housing 90a, the through-bore holes 138a, the bore holes 126a in the tubular portion 120a of the first valve element, the bore hole 108a in the tube element 106a, the bore hole 110a in the recess base 102a of the valve housing 90a, and the bore hole 112a in the actuating cylinder constructional unit 14a. Since the annular recess 98a is open in the direction of the clutch, there would be, at the same time, insofar as no auxiliary valve element 96a was present, a connection constantly between the cylinder space of the pneumatic ring cylinder 16a and the atmosphere, and consequently compressed air would also flow out constantly between the pneumatic source 51a and the atmosphere. The auxiliary valve element 96a, which will be described in more detail below, prevents an unwanted pneumatic connection of this kind between the pneumatic source 51a and the atmosphere and, in cooperation with the first valve element 92a and the second valve element 94a, realizes a switching between the three control states of the control valve which were mentioned in connection with the embodiment in FIG. 1, so that the cylinder space of the pneumatic ring cylinder 16a is either connected with the pneumatic source 51a (first control state) or is connected with the atmosphere (second control state) or is closed so as to be pneumatically tight (third control state).

The auxiliary valve element 96a which is likewise constructed as a ring element is arranged radially between the guide portion 134a of the second valve element and the tubular portion 120a of the first valve element 92a. The auxiliary valve element extends in the axial direction beyond the closure portion 124a of the first valve element 92a in the direction of the clutch and has, at this end on the clutch side, an annular application portion 142a which projects radially inward and which is associated with the first valve element 92a, wherein the first valve element 92a strikes this annular application portion 142a with its closure portion 124a when the clutch is actuated as the result of an axial displacement of the first valve element 92a in the direction of the clutch and accordingly carries the auxiliary valve element 96a along with it. The regions of the closure portion 124a and the application portion 142a which contract one another in this respect are in a pneumatically tight, sealing engagement with one another.

At its end opposite from the application portion 124a associated with the first valve element, that is, at the end remote of the clutch, the auxiliary valve element 96a has another application portion 144a which, in this case, is associated with the second valve element 94a and which is likewise annularly shaped. A helical pressure spring 148a surrounding the auxiliary valve 96a is tensioned between an annular collar of the auxiliary valve element 96a, which annular collar is adjacent to the application portion 144a, and an annular part 146a which is fixed (for example, screwed in or clamped in) in the second valve element 94a at its end on the clutch side. The auxiliary valve element 96a is pretensioned by this helical pressure spring 148a in the striking direction and engagement direction between the application portion 144a of the auxiliary valve element 96a associated with the second valve element 94a and the clutch side of the end portion 128a of the second valve element 94a. Provided the closure portion 124a of the first valve element 92a does not strike against the application portion 142a of the auxiliary valve element 96a associated with the first valve element 92a and displace it against the force of the pressure spring 148a relative to the second valve element 94a in the direction of the clutch, the engagement between the application portion 144a of the auxiliary valve element 96a and the end portion 128 of the second valve element 94a is produced by the action of the pressure spring 148a. The regions of the application portion 144a and end portion 128a contact one another in a pneumatically tight, sealing engagement.

The annular part 146a in the second valve element 94a carries a sealing ring 150a in an annular groove, by means of which sealing ring 150a the auxiliary valve element 96a is guided in the second valve element 94a so as to be displaceable in a pneumatically tight manner. Also, the engagement between the annular part 146a and the second valve element 94a is pneumatically tight, so that in the event that the closure portion 124a of the first valve element 92a does not act on the application portion 142a of the auxiliary valve element 96a associated therewith, an annular space 152a, defined by the tubular portion 120a of the first valve element 92a and by the auxiliary valve element 96a, is closed so as to be pneumatically tight relative to the atmosphere. If the application portion 142a of the auxiliary valve element 96a associated with the first valve element 92a and the closure portion 124a of the first valve element 92a do not engage with one another, a connection is produced between the above-mentioned annular space 152a and the atmosphere via an annular opening 154a defined by the application portion 142a. This annular opening 154a forms the pressure compensation port 70a of the control valve 42a.

Figure 3B:
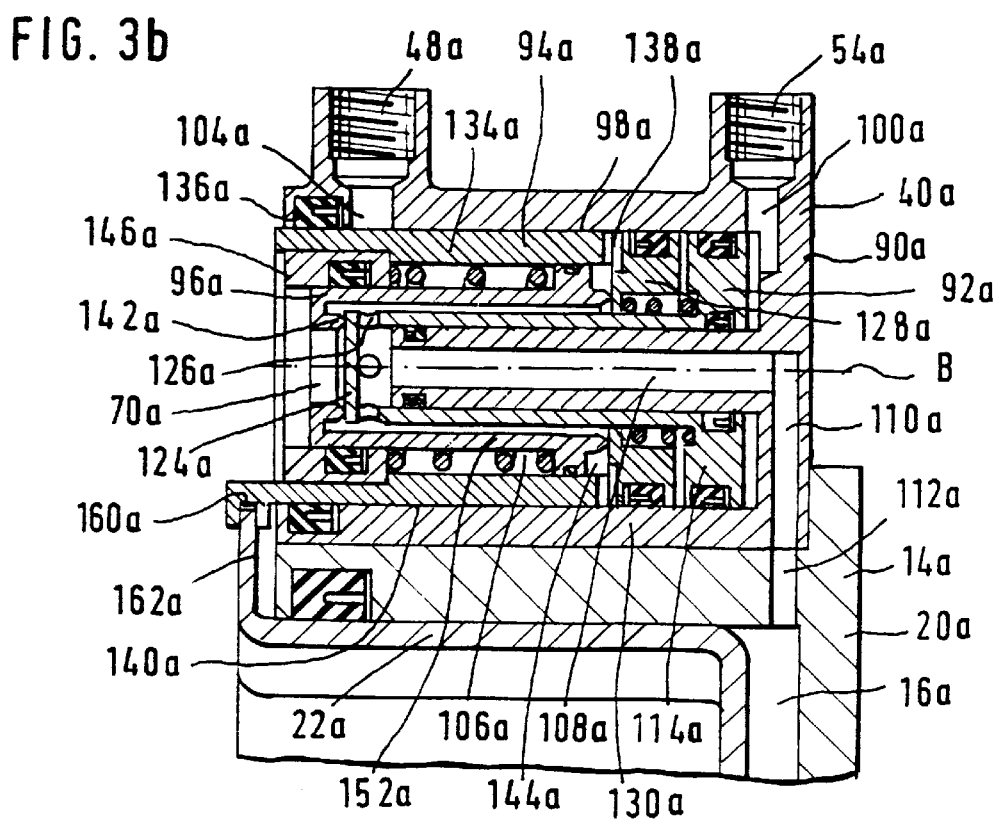
FIGS. 3b, 4a and 4b show a sequence of different positions and states of the control valve and of the pressure medium power cylinder arrangement during actuation of the actuating device for releasing the clutch.
Figure 4A:
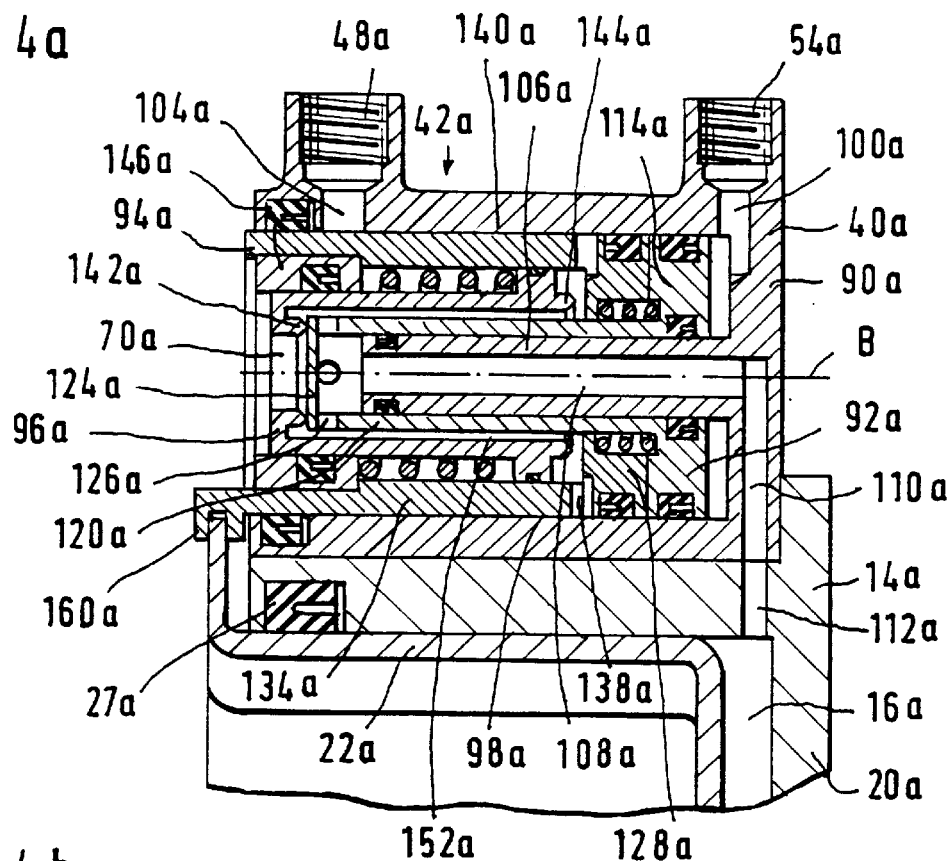
Figure 4B:
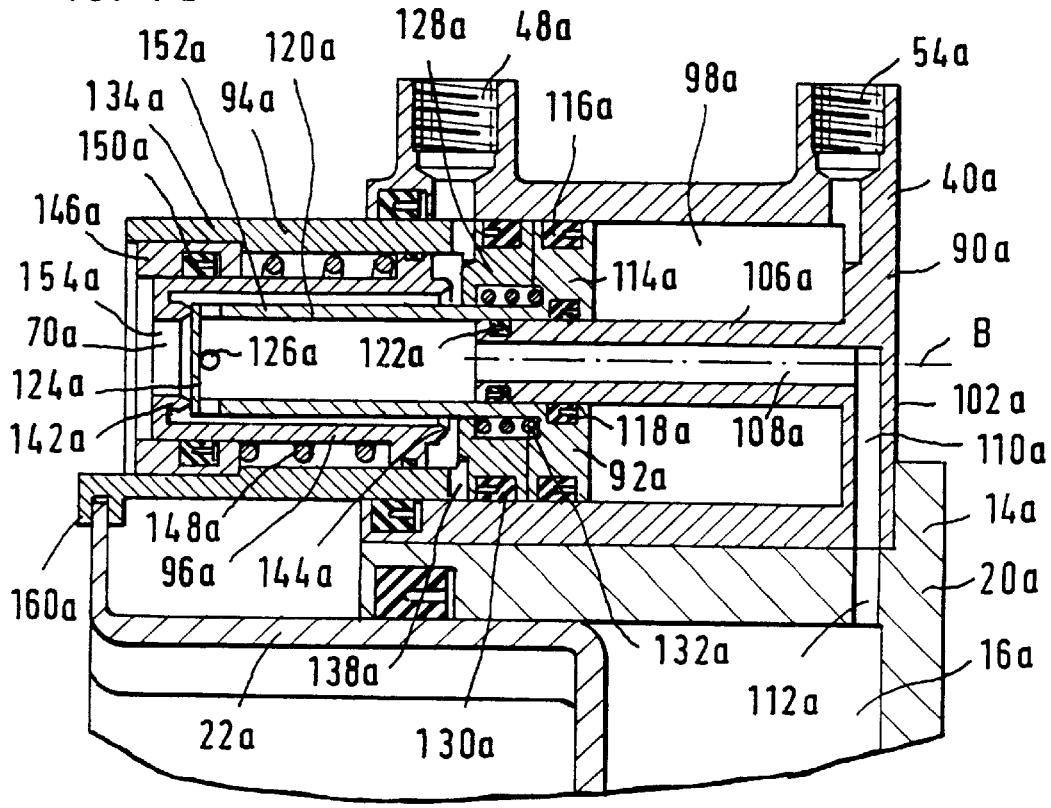
Figure 6:
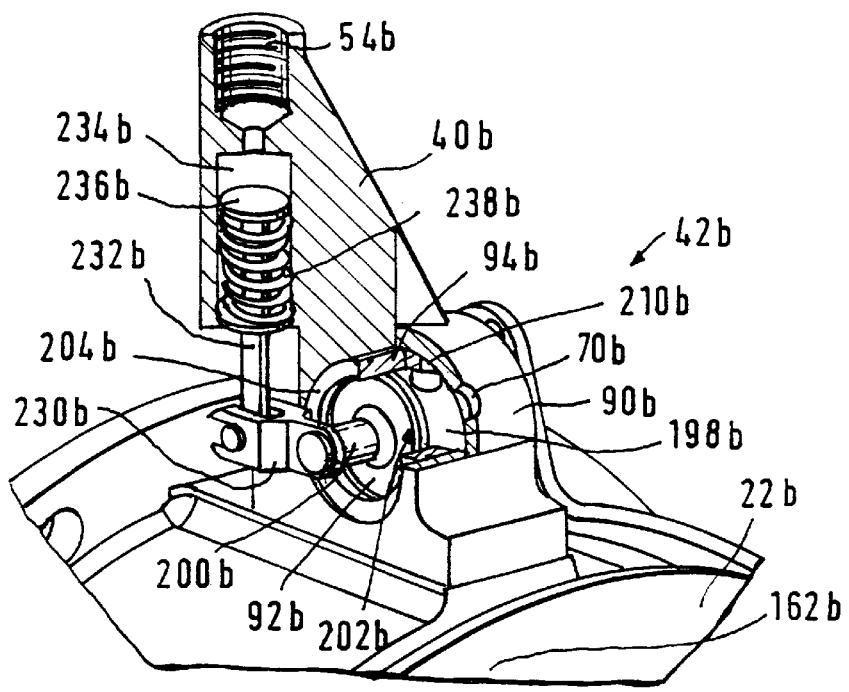
FIG. 6 shows the control valve and a portion of the pressure medium power cylinder arrangement of FIG. 5 in a perspective view from another viewing direction in partial section.

The annular space 152a between the auxiliary valve element 96a and the tubular portion 120a of the first valve element 92a constantly communicates with the cylinder space of the pneumatic ring cylinder 16a via the bore holes 126a and the bore holes 108a, 110a and 112a. Whether or not this annular space 152a also communicates with the pneumatic source 51a via the bore holes 138a, the annular space 140a between the second valve element 94a and the valve housing 90a, and the pneumatic connection 104a, 48a, 50a depends on the position of the auxiliary valve element 96a relative to the second valve element 94a. When the application portion 144a of the auxiliary valve element 96a associated with the second valve element 94a does not engage with the end portion 128a of the second valve element 94a, this is only the case when the closure portion 124a of the first valve element 92a acts on the application portion 142a of the auxiliary valve element 96a associated with it and carries the auxiliary valve element 96a along with it in the direction of the clutch against the force of the pressure spring 148a, the annular space 152a and accordingly the cylinder space of the pneumatic ring cylinder 16a are in a pneumatic connection with the pneumatic source 51a (FIGS. 4a and 4b). On the other hand, if the application portion 144a and end portion 128a of the second valve element 94a engage, the pneumatic connection between the pneumatic source 51a and the cylinder space of the pneumatic ring cylinder 16a is interrupted and the cylinder space of the pneumatic ring cylinder 16a is either closed so as to be pneumatically tight (this is the case when the closure portion 124a of the first valve element 92a simultaneously acts on the associated application portion 142a of the auxiliary valve element 96a; FIG. 3b) or the annular space 152a and accordingly the cylinder space of the pneumatic ring cylinder 16a communicate with the atmosphere via the pressure compensation port 70a (this is the case when the closure portion 124a of the first valve element 92a does not act on the associated application portion 142a of the auxiliary valve element 96a; compare FIG. 3a).

As concerns the manner of functioning of the control valve 42a, the axial position of the second valve element 94a represents the axial position of the release bearing arrangement (not shown). For this purpose, the second valve element 94a is connected so as to be free of play with a flange like end portion 162a of the pneumatic ring piston element 22a on the clutch side via a forked coupling portion 160a forming one part with the second valve element 94a, so that the second valve element 94a and the pneumatic ring piston element 22a are rigidly coupled with respect to movement axially. The axial position of the first valve element 92a, on the other hand, represents the axial reference position of the release bearing arrangement. A differential quantity which is represented by the relative position of the first valve element 92a and of the second valve element 94a relative to one another is associated with the actual position of the release bearing arrangement and the reference position of the release bearing arrangement. When the actual position of the release bearing arrangement corresponds to the reference position when the clutch is released, the first valve element 92a and the second valve element 94a assume a determined position relative to one another, namely that relative position in which an engagement is produced simultaneously between the application portion 142a of the auxiliary valve element 96a and the closure portion 124a of the first valve element 92a and the application portion 144a of the auxiliary valve element 96a and the end portion 128a of the second valve element 94a, so that the cylinder space of the pneumatic ring cylinder 16a is closed in a pneumatically tight manner (compare FIG. 3b).

The manner of operation of the control valve 42a is most clear when considering a sequence of control states during actuation of the clutch. In the basic state, when the clutch pedal arrangement 60 is not actuated, the control valve assumes the state shown in FIG. 3a. In this basic state, the cylinder space of the pneumatic ring cylinder 16a communicates with the atmosphere via the pressure compensation port 70a, so that atmospheric pressure prevails in the cylinder space. Accordingly, external influences (e.g., temperature), which could otherwise lead to an unwanted change of pressure in the cylinder space, do not have an effect. Since the application portion 144a of the auxiliary valve element 96a (which can also be called a sealing piston) engages with the end portion 128a of the second valve element 94a (which can also be called a release path unit), the compressed air of the pneumatic source 51a is retained.

When the driver actuates the clutch pedal 62a, the first valve element 92a (which can also be called a pedal path unit) is displaced in the direction of the clutch (toward the left in the Figures). In so doing, the engagement between the application portion 142a of the auxiliary valve element 96a and the closure portion 124a of the first valve element 92a is produced first, that is, the venting of the cylinder space of the pneumatic ring cylinder 16a via the pressure compensation port 70a is closed (FIG. 3b), before the pneumatic connection between the pneumatic source 91a and the cylinder space of the pneumatic ring cylinder 16 is produced in that the first valve element 92a carries along the auxiliary valve element 96a relative to the second valve element 94a, that is displaces the application portion 144a of the auxiliary valve element against the force of the pressure spring 148a in the direction of the clutch such that it is lifted from the end portion 128a of the second valve element 94a (FIG. 4a). The compressed air can now flow from the pneumatic source 51a into the cylinder space of the pneumatic ring cylinder 16a, so that the pneumatic ring piston element 22a moves against the force of the diaphragm spring in the direction of the clutch. In so doing, the pneumatic ring piston element 22a carries the second valve element 94a along in the direction of the clutch via the coupling portion 160a, so that the second valve element 94a also follows the path given by the first valve element 92a (FIG. 4b). If the pedal 62a is not actuated further, the second valve element 94a finally reaches an axial position in which the closure portion 124a of the first valve element 92a acts on the associated application portion 142a of the auxiliary valve element 96a and the end portion 128a of the second valve element also acts on the associated application portion 144a of the auxiliary valve element 96a, so that the cylinder space of the pneumatic ring cylinder 16a is closed in a pneumatically tight manner. There is then an equilibrium of forces between the diaphragm spring force on the pneumatic ring piston element 22a and the force exerted by the compressed air in the cylinder space of the pneumatic ring cylinder 16a on the pneumatic ring piston element, so that the pneumatic ring piston element 22a and accordingly the release bearing arrangement are held in the axial position that is arrived at (compare FIG. 3b).

If the clutch pedal 62a is partially or completely released, the pressure spring 132a acting between the first valve element 92a and the second valve element 94a can displace the first valve element 92a relative to the second valve element 94a in the direction of the recess base 102a, so that the engagement between the closure portion 124a of the first valve element 92a and the associated application portion 142a of the auxiliary valve element 96a is canceled. The cylinder space of the pneumatic ring cylinder 16a is vented via the pressure compensation port 70a until either this engagement is restored (if the clutch pedal 62a is only partially released) or the basic state of FIG. 3a is reached (if the clutch pedal 62a is completely released), since the diaphragm spring of the clutch can displace the pneumatic ring piston element 22a due to the venting of the cylinder space and can accordingly displace the second valve element 94a away from the clutch in the direction of the transmission.

In contrast to the embodiments in FIG. 1 to FIG. 4, in which the valve elements of the control valve are displaceable along the valve axis for representing the axial actual position of the release bearing arrangement or of the pneumatic ring piston element 22a by the axial displacement position of the second valve element 94a and for representing the axial reference position of the release bearing arrangement or of the pneumatic ring piston element 22a by the axial displacement position of the first valve element 92a, the first valve element 92b in the embodiment of FIGS. 5 to 9 is rotatable about a valve axis B' for representing the axial actual position of the release bearing arrangement or of the pneumatic ring piston element 22b by the rotational position of the second valve element 94b and for representing the reference position of the release bearing arrangement or of the pneumatic ring piston element 22b by the rotational position of the first valve element 92b.

The valve housing 90b has a circular cylindrical through-bore hole 180b which extends coaxially to the valve axis B' transversely through the valve housing 90b, is open toward both sides, and receives the two valve elements, that is, the first valve element 92b and the second valve element 94b. A third valve element, or auxiliary valve element, is not provided in this embodiment, so that the control states of the control valve are realized only by the first valve element 92b and the second valve element 94b.

Three radial bore holes 182b, 184b and 186b, lying in a common plane orthogonal to the valve axis B', open into the through-bore hole 180b. There is the same circumferential angular distance between the radial bore hole 182b and the radial bore hole 184b, between the radial bore hole 184b and the radial bore hole 186b, and between the radial bore hole 186b and the radial bore hole 182b. Each of the three bore holes covers a circumferential angular area of identical magnitude. In the view according to FIG. 8, the three radial bore holes follow one another along the circumference of the through-bore hole 180b in the clockwise direction in the following sequence: 182b, 184b, 186b.

The radial bore hole 182b produces a connection between the interior of the through-bore hole 180b and the atmosphere and serves as the pressure compensation port 70b of the control valve. The radial bore hole 184b is part of the pneumatic connection 48b and accordingly produces a pneumatic connection between the interior of the through-bore hole 180b and the pneumatic source 51b via the pneumatic line 50b. Adjoining the radial bore hole 186b are bore holes 188b in the body part 20b of the actuating cylinder constructional unit 14b by means of which a connection is produced between the interior of the through-bore hole 180b and the cylinder space of the pneumatic ring cylinder 16b (compare FIG. 8). (The first valve element 92b is not yet considered in these remarks). The intersecting bore holes 190b and 192b are closed toward the outside of the body part 20b by pressed in closing balls 194b.

Figure 7:
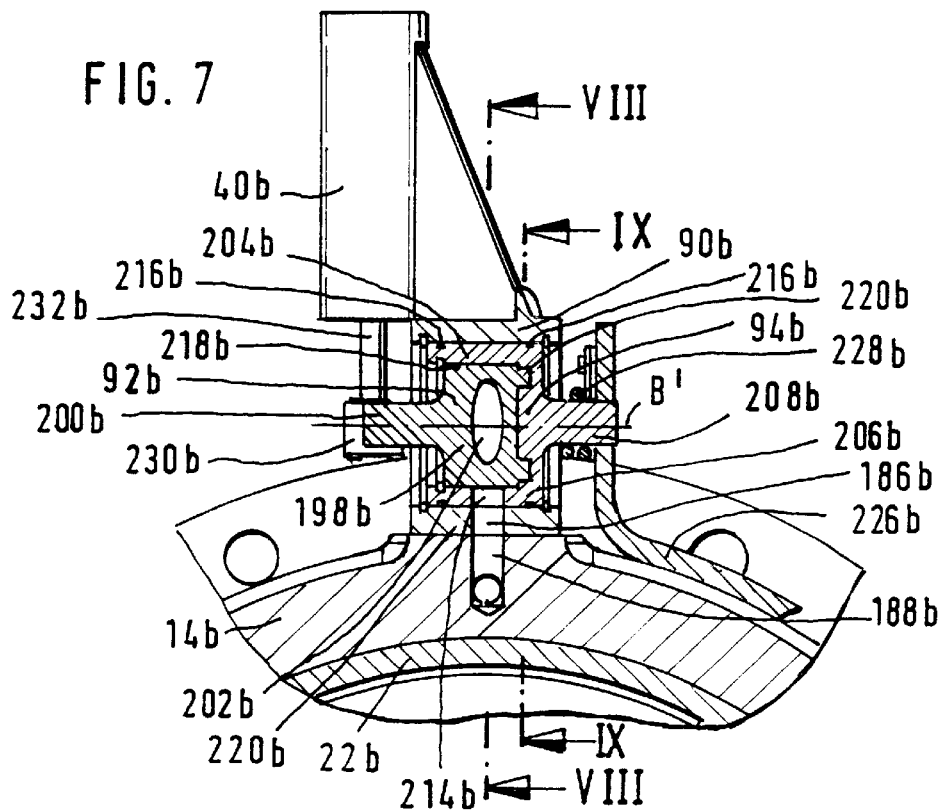
FIG. 7 shows a section through the control valve and a portion of the pressure medium ring cylinder, especially of a pneumatic ring cylinder of the pressure medium power cylinder arrangement of FIG. 5 according to line VII—VII in FIG. 8.

The first valve element 92b has a circular cylindrical main portion 198b coaxial to the valve axis B' which is received in the through-bore hole 180b and is adjoined by a pin portion 200b of the first valve element 92b, wherein this pin portion 200b is likewise circular cylindrical and coaxial to the valve axis B' and projects out of the through-bore hole 180b on one side (the left side in FIG. 7). The main portion 198b has a through-bore hole 202b which is directed radially toward the valve axis B' and lies in the same plane vertical to the valve axis B' as the radial bore hole 182b, 184b and 186b.

The main portion 198b of the first valve element 92b in the through-bore hole 180b is enclosed by a circular cylindrical annular portion 204b of the second valve element 94b which fills up the remaining annular space between the main portion 198b and the inner circumferential surface of the through-bore hole 180b, and is coaxial to the valve axis B'. Adjoining the annular portion 204b in the direction of the end of the through-bore hole 180b opposite from the pin portion 200b is a circular wall portion of the second valve element 94b, which wall portion is still arranged in the through-bore hole 180b and substantially corresponds thereto in radius. A circular cylindrical pin portion 208b which projects from the through-bore hole 180b and is coaxial to the valve axis B' in turn adjoins the circular wall portion. The pin portion 200b of the first valve element 92b thus projects on one side of the through-bore hole 180b and the pin portion 208b of the second valve element 94b projects on the other side of the through-bore hole 180b.

The annular portion 204b of the second valve element 94b has three elongated through-recesses 210b, 212b and 214b which can be called slots or apertures, each of which extends in the circumferential direction with respect to the valve axis B' and lies in the same plane orthogonal to the valve axis B' as the radial bore holes 182b, 184b and 186b and the through-bore hole 202b. Each of the three through-recesses 210b, 212b and 214b, which will be referred to hereinafter as apertures for the sake of brevity, covers an identically large circumferential angle, and the circumferential angle distances between the aperture 210b and aperture 212b, between aperture 212b and aperture 214b, and between aperture 214b and aperture 210b are of identical magnitude. The circumferential angle covered by the apertures is approximately 95°, whereas the circumferential angular distance between the apertures is roughly 25°. The radial bore holes 182b, 184b, and 186b, the through-bore hole 202b, and the apertures 210b, 212b and 214b extend in the axial direction over the same axial area of the control valve, as can be seen clearly in FIG. 7.

Provided in the outer circumferential surface of the annular portion 204b of the second valve element 94b are sealing rings 216b at both sides of the apertures 210b, 212b, 214b. A sealing ring 218b which is offset relative to the through-bore hole 202b in the direction of the pin portion 200b is provided in the main portion 198b of the first valve element 92b. The sealing rings 216b, 218b serve to seal the axial region of the through-bore hole 180b between the sealing rings 216b so as to be pneumatically tight relative to the two open ends of the through-bore hole 180b, which axial region comprises the radial bore holes 182b, 184b and 186b, the through-bore hole 202b and the apertures 210b, 212b and 214b. Further, retainer rings or snap rings, which are shown in FIG. 7 but are not provided with references numbers, secure the second valve element 94b in the through-bore hole 180b and the first valve element 92b with its main portion 198b in the interior of the annular portion 104b of the second valve element 94b.

Figure 9:
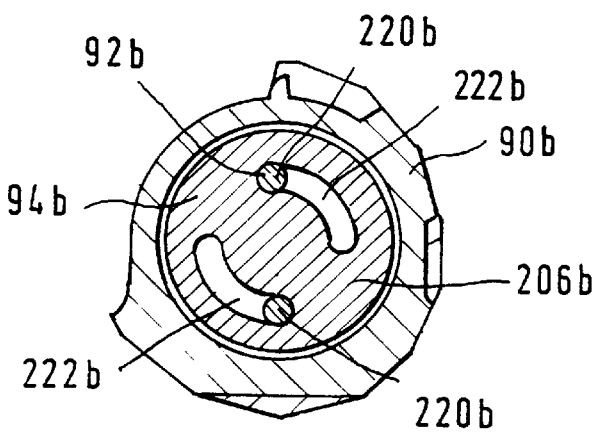
FIG. 9 shows a section through the control valve of FIG. 5 according to line IX—IX in FIG. 7.
Figure 12:
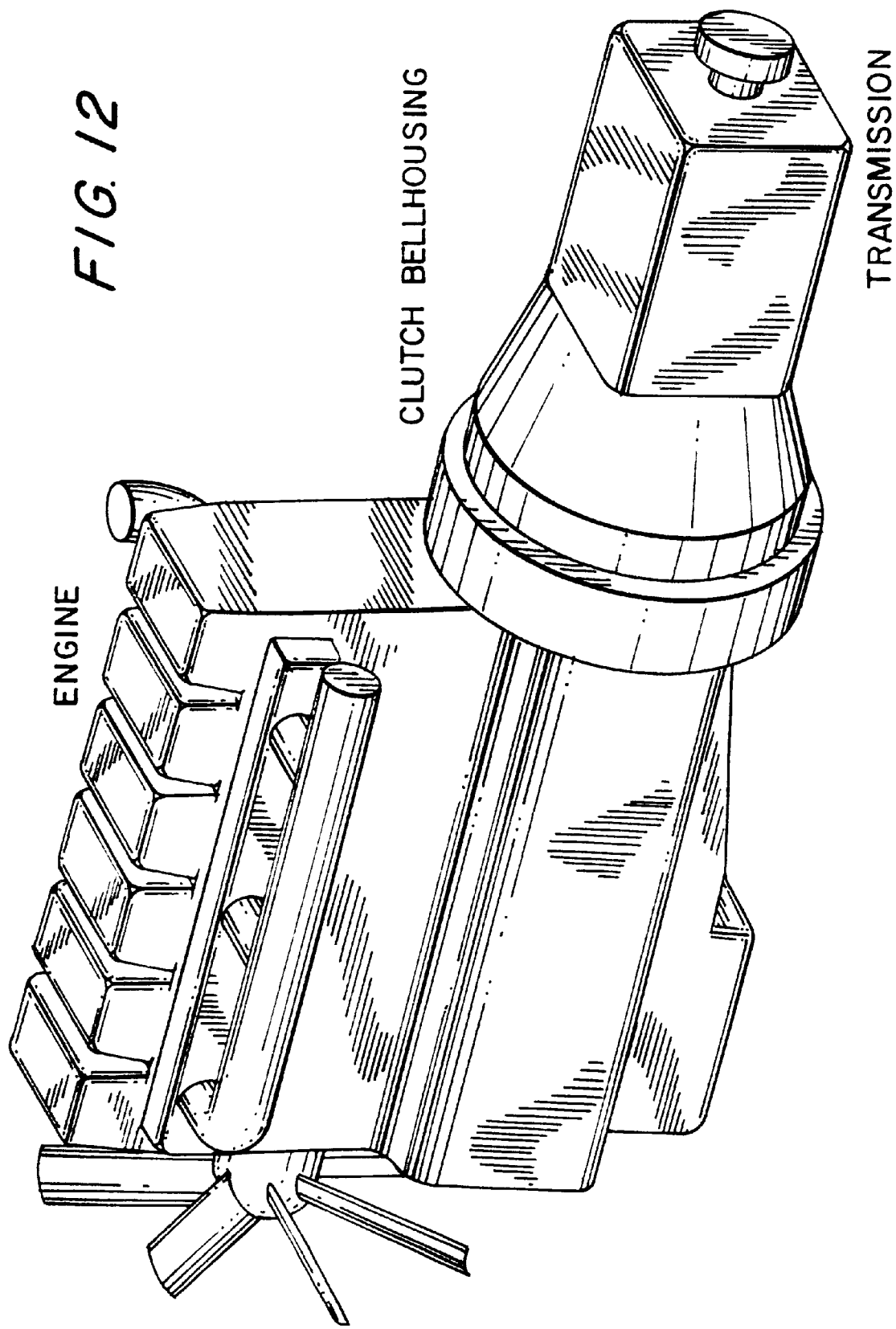
FIG. 12 shows the clutch housing between the transmission and the engine.

The two valve elements 92b and 94b are rotatable relative to one another only to a limited extent, since two pins 220b, which are radially offset relative to the valve axis B' and which engage in a respective recess 222b extending along a circular arc in the wall portion 206b of the second valve element 94b, are provided at the axial end face of the main portion 198b of the first valve element 92b located opposite from the pin portion 200b (compare FIG. 7 and FIG. 9). Due to the dimensioning of the recesses 222b, it is possible for the two valve elements to rotate relative to one another over an angular range of approximately 75° to 80°.

The two valve elements 92b and 94b are constructed with reference to the apertures 210b, 212b and 214b, the through-bore hole 202b, the pins 220b, and recesses 222b in such a way that, in every possible relative rotational position of the two valve elements, the through-bore hole 202b communicates with aperture 214b on one side and communicates with either aperture 210b or aperture 212b on the other side or is closed in a pneumatically tight manner by a portion 224b between the two apertures 210b and 212b, which portion 224b forms a closure and control portion. In so doing, the aperture 210b constantly communicates with the pressure compensation port 70b, the aperture 212b constantly communicates with the pressure medium source 51b via the bore hole 184b, and the aperture 214b constantly communicates with the cylinder space of the pneumatic ring cylinder 16b via the bore hole 186b.

The second valve element 94b is coupled with respect to movement to the pneumatic ring piston element 22b so that precisely one rotational position of the second valve element 94b is associated with every axial position (with reference to the clutch axis) of the pneumatic ring piston element 22b and accordingly of the release bearing arrangement. For this purpose, a yoke 226b is arranged at the pin portion 208b of the second valve element 94b so as to be fixed with respect to rotation relative to it. The yoke 226b is pretensioned against the flange-like end portion 162b of the pneumatic ring piston element 22b by means of a helical spring enclosing the pin portion 208b and acting on the yoke 226b and on the valve housing 90b (compare FIG. 5 and FIG. 7). The yoke 226b acts at the side of the end portion 162b remote of the clutch.

A lever 230b is arranged at the pin portion 208b so as to be fixed with respect to rotation relative to it and, together with a piston rod 232b of a cylinder-piston arrangement 234b, forms a two-armed toggle lever. The cylinder-piston arrangement 234b is a hydraulic slave cylinder which is connected with the clutch pedal arrangement 60b, 62b via the connection 94b and the hydraulic line 56b. A piston 236b at the piston rod 232b is pretensioned by a helical pressure spring 238b so as to reduce the cylinder space of the hydraulic slave cylinder 234b. The hydraulic slave cylinder 234b is constructed with the valve housing 90b as a constructional unit.

The toggle lever arrangement comprising the lever 230b and the piston rod 232b serves to convert a displacing movement of the piston 236b into a rotating movement of the first valve element 92b. Precisely one rotational position of the first valve element 92b is associated with every displacing position of the piston 236b.

Figure 8:
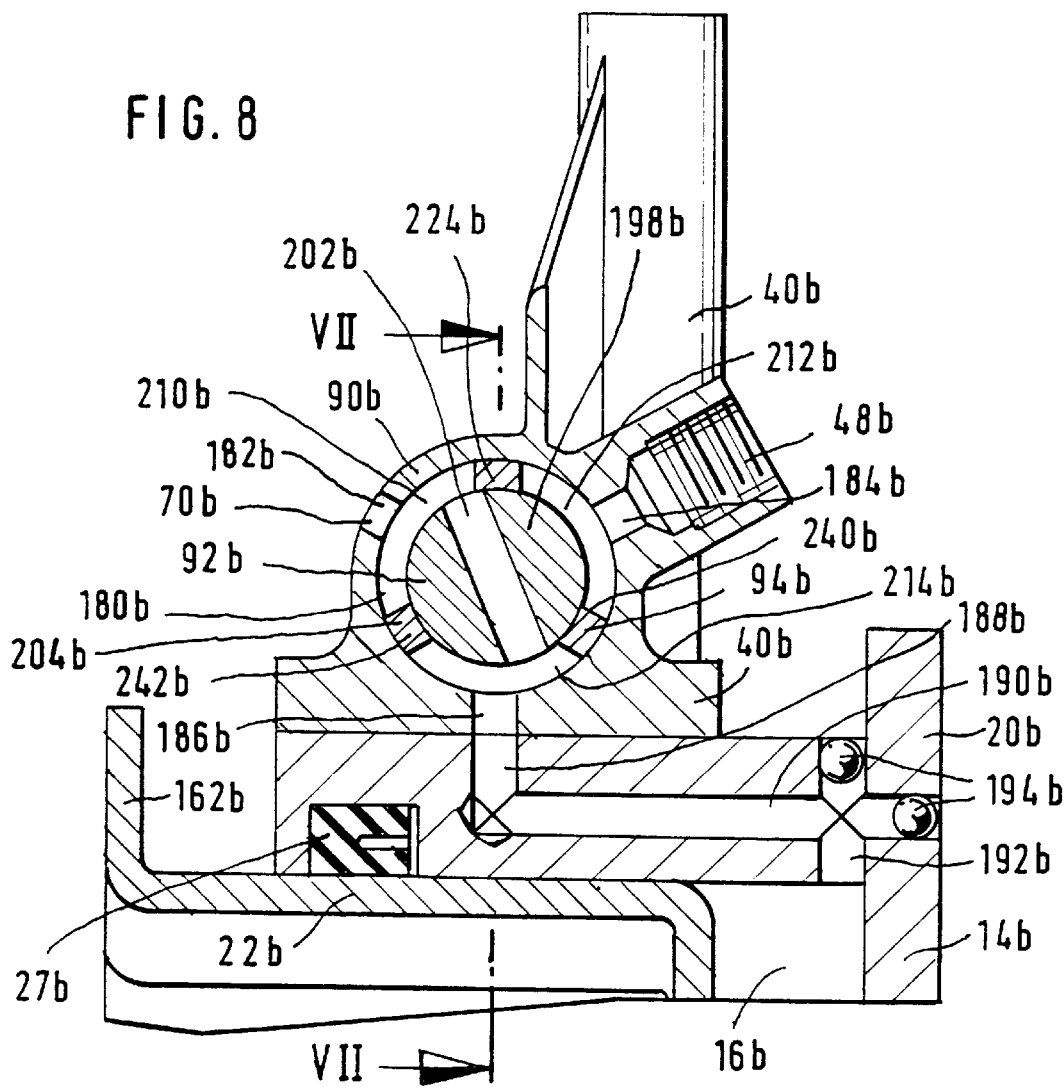
FIG. 8 shows a section through the control valve and a portion of the pressure medium power cylinder arrangement of FIG. 5 according to line VIII—VIII in FIG. 7.

In a basic position of the control valve in which the clutch pedal 92b of the clutch pedal arrangement 60b is not pressed and the pneumatic ring piston element 22b is not released, that is, it assumes its axial position farthest from the clutch, the outlet opening of the through-bore hole 202b in the main portion 198b of the first valve element 92b, which outlet opening is located opposite to the aperture 214b, is arranged approximately opposite from the pressure compensation port 70b and the closure and control portion 224b is offset somewhat relative to the pressure compensation port 70b in the clockwise direction with reference to FIG. 8 in the direction of the bore hole 184b. The other outlet opening of the through-bore hole 202b is located opposite to the aperture 214b, that is, it is not closed by the portion 240b of the annular portion 204b of the second valve element 94b, which portion 240b separates the aperture 214b from the aperture 212b. Accordingly, in the described basic state, a constant venting connection between the cylinder space of the pneumatic ring cylinder 16b and the pressure compensation port 70b, namely via bore holes 192b, 190b, 186b, the aperture 214b, the through-bore hole 202b, and the aperture 210b. The compressed air of the pneumatic source 51b is held back by the closure and control portion 225b and the portion 240b of the annular portion 204b of the second valve element 94b.

When the driver actuates the clutch pedal 62b, the first valve element 92b (which can also be called the pedal path unit) is rotated in the direction of the bore hole 184b forming the compressed-air inlet opening with the outlet opening of the through-bore hole 202b, which outlet opening has been located until now approximately opposite from the venting opening 70b. The closure and control portion 224b forming a control edge crosses over between the aperture 210b and the aperture 212b and venting is initially closed in that the closure and control portion 224b closes the through-bore hole 202b, whereupon the venting connection is produced between the cylinder space of the pneumatic ring cylinder 16b and the pneumatic source 51b, namely via the bore hole 184b, the aperture 112b, the through-bore hole 202b, and the bore holes 186b, 188b, 190b and 192b. When compressed air flows into the cylinder space, the pneumatic ring piston element 22b moves against the force of the diaphragm spring in the direction of the clutch. The second valve element 94b (which can also be called the release path unit) follows the rotational angle predetermined by the first valve element 92b. While compressed air is being supplied to the cylinder space of the pneumatic ring cylinder 16b, the closure and control portion 224b and a portion of the annular portion 204b of the second valve element 94b separating the aperture 214b from the aperture 210b prevents the supplied compressed air from flowing out of the pressure compensation port 70b.

When the clutch pedal 62b is held in the achieved actuating position, the closure and control portion 224b closes the through-bore hole 202b in the main portion 198b of the first valve element 92b again when the rotational angle predetermined by the first valve element is reached, so that the supply of compressed air is interrupted, but also no venting connection is produced between the cylinder space of the pneumatic ring cylinder 16b and the pressure compensation port 70b. There is then an equilibrium of forces between the force exerted on the pneumatic ring piston element 22b by the diaphragm spring and the force exerted on the pneumatic ring piston element 22b by the compressed air in the cylinder space of the pneumatic ring cylinder 16b.

When the clutch pedal 62b is released again, the first valve element 92b is rotated in the opposite direction due to the spring force exerted by the spring 238b on the piston 236b, so that the venting connection is produced again between the pressure compensation port 70b and the cylinder space of the pneumatic ring cylinder 16b and the pneumatic ring piston element 22b is pushed away from the clutch in the direction of the transmission by the force of the diaphragm spring accompanied by corresponding rotation of the second valve element 94b.

As was made clear in the preceding remarks, in the embodiments described above with reference to FIGS. 5 to 9, the reference position of the pneumatic ring piston element 22b, and accordingly of the release bearing arrangement, and the instantaneous actual position of the pneumatic ring piston element 22b, and accordingly of the release bearing arrangement, are represented by rotational positions of the first valve element 92b and of the second valve element 94b, respectively. Thus, the rotational position of the first valve element 92b represents a control quantity and the rotational position of the second valve element 94b represents an actual quantity, on the basis of which the control valve is switched between the control states which were indicated generally in connection with FIG. 1. A differential quantity which represents the relative rotational position of the two valve elements relative to one another can be associated with the control quantity and the actual quantity.

It is important to note that rotatable valve elements which represent, by way of their rotational positions, the control quantity, actual quantity and differential quantity can also work with an auxiliary valve element which, in particular, is likewise rotatable and cooperates with the first and second valve elements in order to realize the control states by closing and opening pressure medium connections inside the control valve. Conversely, it is also possible in a control valve whose valve elements are displaceable along a valve axis for representing the control quantity, actual quantity and differential quantity to work with only two valve elements, that is, it is possible to dispense with an additional auxiliary valve element which is displaceable along the valve axis in that one of the two valve elements is constructed with a control edge which switches between two alternative pressure medium connections and closes a pressure medium path common to both pressure medium connections.

The fact that the operating principles of a control valve with valve elements which are arranged so as to be rotatable and which represent the aforementioned variables by means of their rotational positions can be transferred to a control valve with valve elements which are arranged so as to be displaceable and which represent the aforementioned variables by means of their displacement positions (and vice versa) is especially clear when comparing the embodiment in FIGS. 5 to 9 with the embodiment of FIGS. 10 and 11, to be described below. In the embodiment in FIGS. 10 and 11, the same reference numbers as those used in the embodiment in FIGS. 5 to 9 are used to a great extent, wherein, in order to distinguish between them, the reference numbers for the embodiment in FIGS. 10 and 11 are identified by the letter "c". As regards the embodiment in FIGS. 10 and 11, the preceding description of the embodiment of FIGS. 5 to 9 is referred to expressly and only the differences between the two embodiments will be described.

Like the control valve 42b, the control valve 42c likewise has two valve elements, a first valve element 92c and a second valve element 94c, arranged in a valve housing 90c. In contrast to the embodiment in FIGS. 5 to 9, these valve elements are displaceable along a valve axis B" and represent the control quantity, the actual quantity, and the differential quantity by means of displacement positions or axial positions. In this respect, reference is had to the embodiment of FIGS. 2 to 4.

There is a great similarity between the control valve of FIGS. 5 to 9 and the control valve in FIGS. 10 and 11 in that the control valve in FIGS. 10 and 11, with respect to its construction in the axial direction, substantially corresponds to a certain extent to an "unwinding" of the control valve in FIGS. 5 to 9 with respect to its construction in the circumferential and rotational direction. Thus, a corresponding rotational position of the valve elements 92b and 94b can be associated with every axial position of the valve elements 92c and 94c.

The valve body 90c has a circular cylindrical recess 180c which is coaxial to the valve axis B" and in which the second valve element 94c is received so as to be displaceable along the valve axis B". The second valve element 94c has a circular cylindrical recess 300c which is likewise coaxial to the valve axis B" and in which the first valve element 92c is arranged so as to be displaceable along the valve axis B" with a control portion 302c. The first valve element 92c has a portion 200c which projects out of the valve housing 90c and receives the control quantity, and the second valve element 94c has a portion 208c which projects out of the valve housing 90c on the opposite side and which receives the actual quantity.

The valve housing 90c has three bore holes 182c, 186c and 184c which are offset in the axial direction (valve axis B") relative to one another and which follow one another in the above-indicated sequence in the direction from portion 200c to portion 208c. The axial distance between bore holes 182c and 186c is identical to the axial distance between bore holes 186c and 184c. The bore holes are directed radially with respect to the valve axis B" and open into the recess 180c of the valve housing 90c. The bore holes 182c, 184c, 186c are also offset relative to one another in the circumferential direction; however, this is of no further importance for the operation of the control valve and serves only to facilitate a compact construction of the control valve in the axial direction.

The second valve element 94c has three apertures 210c, 214c and 212c which are offset relative to one another in the axial direction (valve axis B"), wherein the apertures follow one another in the above-indicated sequence in the direction from portion 200c to portion 208c. Each of the apertures mentioned above is formed by an elongated recess extending in the axial direction and by a bore hole which lies further inward radially and is provided in the axial center of the recess, so that a connection can be produced between the outer space of the second valve element 94c and the recess 300c provided therein by means of the elongated recess and the bore hole. In every axial position of the second valve element 94c, the aperture 210c is open toward bore hole 182c, aperture 214c is open toward bore hole 186c, and aperture 212c is open toward bore hole 184c, since the respective elongated recess of the aperture in question covers the respective bore hole in the valve housing radially inside. Accordingly, without taking into account the first valve element 92c, there is constantly a connection between the bore holes 182c, 186c and 184c and the recess 300c in the interior of the second valve element 94c and accordingly a connection between the bore holes.

The control portion 302c of the first valve element 92c serves to open and close the connections between the bore holes 182c, 186c and 184c depending on the axial relative positions of the two valve elements. For this purpose, the control portion 302c has two closure portions 306c and 308c, each of which forms a control edge and which, insofar as they cover the radial inner bore hole of the respective aperture 210c and 212c, close the latter toward the recess 300c in the second valve element 94c.

Between the two closure portions 306c and 308c, the control portion 302c of the first valve element 92c has an annular recess which is open radially outward and which forms an annular channel 202c. The annular channel 202c is open in every axial relative position of the two valve elements to one another at least to the aperture 214c and accordingly to the bore hole 186c leading to the pressure medium power cylinder arrangement.

Depending on the axial relative position of the two valve elements relative to one another, the annular channel 202c is open either only to aperture 214c and accordingly to bore hole 186c or, additionally, to aperture 212c and accordingly to the bore hole 184c leading to the pressure medium supply, or to aperture 210c and accordingly to the bore hole 182c serving as pressure compensation port 70c.

In the basic position of the control valve, shown in FIG. 11a, in which the clutch is not released, there is a venting connection between the bore hole 186c and the bore hole 182c via the annular channel 202c. If the first valve element 94c is displaced toward the left as viewed in FIG. 11 corresponding to a control quantity which increases due to a clutch pedal actuation, for example, the radial inner bore hole of the aperture 210c is closed first by the closure portion 306c before the closure portion 308c which closed the radial inner bore hole of the aperture 212c in the basic position has moved past this radially inner bore hole to this extent, until a pressure medium connection is produced between the bore holes 186c and 184c in the control valve housing 90c via the apertures 212c, 214c and the annular channel 202c, and pressure medium is supplied to the power cylinder arrangement. FIG. 11b shows the control valve in a state of maximum clutch actuation in which a pressure medium connection of this kind is produced between the bore holes 184c and 186c.

If there is no maximum clutch actuation, the two valve elements assume an axial relative position to one another when the actual quantity is identical with the control quantity such that the closure portion 306c closes the radial inner bore hole of the aperture 210c and the closure portion 208c closes the radial inner bore hole of the aperture 212c, so that there is no pressure medium connection between the pressure medium power cylinder arrangement on the one side and either the pressure compensation port 70c or the bore hole 184c leading to the pressure medium supply on the other side.

With the exception of the above-mentioned bore holes and apertures in the valve housing 90c and in the second valve element 94c, the valve housing and the two valve elements 92c and 94c are constructed so as to be substantially rotationally symmetrical with respect to the valve axis B". However, there are provided means for fixing the rotational position, not shown in the Figures, which interrupt the rotational symmetry and exclude a relative position between the second valve element 94c and the valve housing 90c, so that it is always ensured that the aperture 210c is open to the bore hole 182c, that aperture 214c is open to bore hole 186c, and that aperture 212c is open to bore hole 184c. The bore holes 182c, 186c and 184c and consequently also apertures 210c, 214c and 212c are, as already mentioned, in addition to their respective offset in the axial direction, also offset relative to one another in the circumferential direction (with respect to the valve axis B") in order to keep the control valve short in the axial direction. In principle, the bore holes 182c to 186c and accordingly the apertures 210c to 214c can also be "pulled apart" axially in such a way that the elongated recesses of the apertures extending in the axil direction no longer overlap one another in the projection of the valve axis B", so that annular channels in the manner of the annular channel 202c could be provided at the outer circumference of the second valve element 94c instead of the elongated recesses. In this case, the second valve element 94c could occupy any rotational position relative to the valve housing 90c as is also the case for the first valve element (also in the embodiment of FIGS. 10 and 11).

In summary, the invention is directed to an actuating device for a friction clutch which is arranged in the drivetrain of a motor vehicle between an internal combustion engine and a transmission in a housing cover and which comprises a release bearing arrangement and a positioning servo arrangement for the release bearing arrangement having a pressure medium power cylinder arrangement, wherein the positioning servo arrangement has a control valve connected with a pressure medium source. The control valve comprises a valve arrangement which is switchable between at least two control states depending on an actual quantity representing the axial position of the release bearing arrangement and a control quantity representing a reference position of the release bearing arrangement. In a first control state, there is a pressure medium connection between the pressure medium power cylinder arrangement and the pressure medium source, and in a second control state there is a pressure medium connection between the pressure medium power cylinder arrangement and a pressure compensation port. The valve arrangement comprises two valve elements which are movable relative to one another and relative to a valve housing, wherein the control quantity is represented by the position of a first valve element of the two valve elements and the actual quantity is represented by the position of a second valve element of the two valve elements relative to the valve housing, and a differential quantity associated with the actual quantity and control quantity is represented by the position of the two valve elements relative to one another.

The invention is not limited by the embodiments described above which are presented as examples only but can be modified in various ways within the scope of protection defined by the appended patent claims.

We claim:

1. An actuating device for a friction clutch arranged in a drivetrain of a motor vehicle, in a housing cover between an internal combustion engine and a transmission of the vehicle, the actuating device comprising:

release bearing means movable substantially coaxially to the friction clutch for actuating the friction clutch;

positioning servo means having a pressure medium power cylinder arrangement operatively arranged to act on the release bearing means;

a pressure medium source; and control valve means connected with the pressure medium source and the pressure medium power cylinder arrangement for actuating the pressure medium power cylinder arrangement depending on a control quantity representing a reference position and depending on an actual quantity representing the axial position of the release bearing arrangement, the pressure medium power cylinder arrangement includes a pressure medium ring cylinder which is substantially concentric to a clutch axis and the pressure medium power cylinder arrangement and is arranged inside the housing cover, the pressure medium ring cylinder being constructed to exert a force on the release bearing arrangement that is substantially coaxial to the clutch axis, the control valve means includes a valve arrangement having a valve housing, the valve arrangement being adjustable between a first control state connecting the pressure medium power cylinder arrangement to the pressure medium source and a second control state connecting the pressure medium power cylinder arrangement with a pressure compensation port in the valve housing, the valve arrangement being switchable between the two control states depending on a differential quantity associated with the actual quantity and the control quantity, the valve arrangement including two valve elements which are movable relative to one another and relative to the valve housing, the control quantity being represented by the position of a first valve element of the two valve elements, and the actual quantity being represented by the position of a second valve element of the two valve elements relative to the valve housing, and the differential quantity being represented by the position of the two valve elements relative to one another.

2. An actuating device for a friction clutch arranged in a drivetrain of a motor vehicle, in a housing cover between an internal combustion engine and a transmission of the vehicle, the actuating device comprising:

release bearing means movable substantially coaxially to the friction clutch for actuating the friction clutch;

positioning servo means having a pressure medium power cylinder arrangement operatively arranged to act on the release bearing means;

a pressure medium source; and control valve means connected with the pressure medium source and the pressure medium power cylinder arrangement for actuating the pressure medium power cylinder arrangement depending on a control quantity representing a reference position and depending on an actual quantity representing the axial position of the release bearing arrangement, the control valve means includes a valve arrangement having a valve housing, the valve arrangement being adjustable between a first control state connecting the pressure medium power cylinder arrangement to the pressure medium source and a second control state connecting the pressure medium power cylinder arrangement with a pressure compensation port in the valve housing, the valve arrangement being switchable between the two control states depending on a differential quantity associated with the actual quantity and the control quantity, the valve arrangement including two valve elements which are movable relative to one another and relative to the valve housing, the control quantity being represented by the position of a first valve element of the two valve elements, and the actual quantity being represented by the position of a second valve element of the two valve elements relative to the valve housing, and the differential quantity being represented by the position of the two valve elements relative to one another.

3. An actuating device according to claim 2, wherein the pressure medium power cylinder arrangement includes a pressure medium ring cylinder which is substantially concentric to a clutch axis and is arranged inside the housing cover, the pressure medium ring cylinder being constructed to exert a force on the release bearing arrangement that is substantially coaxial to the clutch axis.

4. An actuating device according to claim 2, wherein the valve arrangement is configured to be adjustable, in dependence on the differential quantity, to a third control state in which the pressure medium power cylinder arrangement is closed so as to be substantially tight against pressure medium.

5. An actuating device according to claim 2, and further comprising transmitter means associated with the release bearing means for outputting an actual value signal indicating the actual quantity, and control signal transmitter means for outputting a control signal indicating the control quantity, the control valve means having a first signal connection for receiving the control signal indicating the control quantity from the control signal transmitter means, and a second signal connection for receiving the actual value signal indicating the actual quantity from the transmitter means associated with the release bearing means.

6. Actuating device according to claim 5, wherein the control valve means is configured so that the control signal acts directly and independently on the first valve element and the actual value signal acts directly and independently on the second valve element.

7. An actuating device according to claim 5, wherein the actual value signal is one of a hydraulic, pneumatic, mechanical and electrical signal represented by one of a pressure, a volume, a force, a path, an angle, a current density, and a voltage, and further comprising converter means associated with the second signal connection for converting the actual value signal to the actual quantity.

8. An actuating device according to claim 2, wherein the positioning servo means includes a mechanical position regulating arrangement with a mechanically coupleable transmitter element configured to one of directly and indirectly detect the position of the release bearing means.

9. An actuating device according to claim 8, the transmitter element is movably coupled with the second valve element so as to act on the second valve element.

10. An actuating device according to claim 9, and further comprising means for substantially rigidly coupling the second valve element with one of the release bearing means and the pressure medium power cylinder arrangement on a side proximate the release bearing arrangement.

11. An actuating device according to claim 10, wherein the coupling means is integral with the second valve element.

12. An actuating device according to claim 9, and further comprising a coupling element coupled with the second valve element and pretensioned against one of the release bearing means and the pressure medium power cylinder arrangement on a release bearing arrangement side.

13. An actuating device according to claim 5, wherein the control signal is one of a hydraulic, pneumatic, electrical, an optical signal represented by a one of pressure, a volume, a force, a path, an angle, a current, a voltage and a light intensity, and further comprising converter means associated with the first signal connection for converting the control signal into the control quantity.

14. An actuating device according to claim 13, wherein the converter means includes a piston coupled with the first valve element.

15. An actuating device according to claim 14, wherein the piston of the converter means is pretensioned by a spring force, the piston being integral with the first valve element.

16. An actuating device according to one claim 2, wherein the valve arrangement further includes an auxiliary valve element which is movable relative to the valve housing and cooperates with at least one of the first valve element and the second valve element in order to provide at least one of the control states.

17. An actuating device according to claim 16, wherein the auxiliary valve element has a first application portion associated with the first valve element and acted upon by the first valve element for at least one of driving the auxiliary valve element and interrupting at least one pressure medium connection inside the control valve means.

18. An actuating device according to claim 17, wherein the application portion of the auxiliary valve element is arranged so as to be acted upon by the first valve element so as to interrupt a pressure medium connection between the pressure medium power cylinder arrangement and the pressure compensation port.

19. An actuating device according to claim 17, wherein the auxiliary valve element has a second application portion associated with the second valve element and acted upon by the second valve element for at least one of driving the auxiliary valve element and interrupting at least one pressure medium connection inside the control valve means.

20. An actuating device according to claim 19, wherein the second application portion of the auxiliary valve element is configured so as to be acted upon by the second valve element so as to at least one of interrupt the pressure medium connection between the pressure medium source and the pressure medium power cylinder arrangement and block a pressure medium connection between the pressure medium source and the pressure compensation port.

21. An actuating device according to claim 19, and further comprising pretensioning means for pretensioning the auxiliary valve element at least one of in a direction of application of the second valve element on the second application portion of the auxiliary valve element and in the direction of application of the first valve element on the first application portion of the auxiliary valve element.

22. An actuating device according to claim 2, wherein the first valve element and the second valve element are configured to have, in each instance, at least one application portion or engagement portion that limits the movement range of the two valve elements relative to one another and selectively limits the movement range of at least one of the valve elements relative to the valve housing.

23. An actuating device according to claim 22, wherein the application portions are configured so that a pressure medium connection between the pressure medium source and the pressure medium power cylinder arrangement is produced inside the control valve means when the application portions of the first valve element and the second valve element which are associated with one another contact one another.

24. An actuating device according to claim 22, and further comprising pretensioning means for providing a spring force between the first valve element and the second valve element.

25. An actuating device according to claim 24, wherein the pretensioning means is configured to have a maximum force when associated application portions of the first valve element and the second valve element contact one another.

26. An actuating device according to claim 2, wherein at least three pressure medium openings are provided in one of the valve elements and the valve housing, the other of the valve elements having at least one portion forming a control edge which cooperates with the at least three pressure medium openings so as to one of interrupt and produce a first pressure medium connection inside the control valve means in at least one relative position of the two valve elements during a movement of one of the valve elements relative to the other of the valve elements in one direction so that the control edge moves past at least one of the pressure medium openings, and so as to produce or interrupt a second pressure medium connection inside the control valve.

27. An actuating device according to claim 26, wherein the control edge is formed on the second valve element, the at least three pressure medium openings including a pressure medium opening in the first valve element and two pressure medium openings in the valve housing, the first pressure medium connection being a connection between the pressure medium source and the pressure medium power cylinder arrangement, the second pressure medium connection being a connection between the pressure compensation port and the pressure medium power cylinder arrangement.

28. An actuating device according to claim 2, wherein one of the valve elements has at least one engagement portion configured to engage in an associated slot-like recess in the other valve element, and further comprising stops arranged at both ends of the recess so as to limit a range of movement of the two valve elements relative to one another.

29. An actuating device according to claim 28, wherein the first valve element has the at least one engagement portion, the engagement portion being configured as a pin-type engagement portion.

30. An actuating device according to claim 2, wherein the control valve means is operative to occupy the second control state in a basic state of the actuating device in which the clutch is not actuated.

31. An actuating device according to claim 2, wherein the valve housing has a recess, the first valve element and the second valve element being mounted in the recess of the valve housing so as to be displaceable along a valve axis, the actual quantity and the control quantity being represented by axial positions of the respective valve element.

32. An actuating device according to claim 17, wherein the valve housing has a recess, the first valve element, the second valve element and the auxiliary valve element being mounted in the recess of the valve housing so as to be displaceable along a valve axis.

33. An actuating device according to claim 32, wherein at least one of the valve elements is constructed at least in some areas as a ring element coaxial to the valve axis and surrounds at least one other of the valve elements radially outside at least in some areas.

34. An actuating device according to claim 32, and further comprising a tube element that is stationary relative to the valve housing and coaxial to the valve axis, the recess being an annular recess which has annular cylindrical walls extending coaxially at a radial distance and extending around the tube element, the tube element having a free end with a pressure medium through-opening which is open in the axial direction as part of at least one pressure medium connection within the control valve.

35. An actuating device according to claim 34, wherein the pressure medium through-opening in the free end of the tube element forms part of at least one of the pressure medium connection between the pressure medium power cylinder arrangement and the pressure medium source, and the pressure medium connection between the pressure medium power cylinder arrangement and the pressure compensation port.

36. An actuating device according to claim 34, wherein the first valve element has an annular portion configured to encircle the tube element at least in some areas, and further comprising at least one annular sealing element arranged to act between the annular portion and the tube element in a sealing manner.

37. An actuating device according to claim 36, and further comprising a further at least one annular sealing element arranged to seal between a radially outer annular cylindrical wall of the annular recess and the annular portion of the first valve element.

38. An actuating device according to claim 36, wherein the first valve element has a tubular portion which adjoins the annular portion axially and at least partially encircles the tube element, and further comprising at least one additional annular sealing element arranged to seal between the tubular portion and the tube element.

39. An actuating device according to claim 36, wherein the auxiliary valve element is constructed as a ring element that at least partially encloses the tubular portion of the first valve element radially outwardly.

40. An actuating device according to claim 39, wherein the first valve element has a closure portion which adjoins the tubular portion and extends substantially in the radial direction so as to cover the pressure medium through-opening in the free end of the tube element in the axial direction, whereby the first valve element acts with the closure portion on the associated first application portion of the auxiliary valve element for at least one of driving and interrupting the at least one pressure medium connection.

41. An actuating device according to claim 40, wherein a pressure medium through-opening is provided in the control valve means as part of a pressure medium connection, the application portion of the auxiliary valve element being configured to radially limit the pressure medium through-opening.

42. An actuating device according to claim 40, wherein the first valve element has, in an end region of the tubular portion adjacent to the closure portion, at least one pressure medium through-opening which is open in a radial direction and forms part of at least one pressure medium connection inside the control valve means.

43. An actuating device according to claim 42, wherein the at least one pressure medium connection in the end region of the tubular portion of the first valve element forms part of at least one of the pressure medium connection between the pressure medium power cylinder arrangement and the pressure medium source, and the press-medium connection between the pressure medium power cylinder arrangement and the pressure compensation port.

44. An actuating device according to claim 33, wherein the second valve element is constructed as a ring element that at least partially encloses at least one of the first valve element and the auxiliary valve element radially outwardly.

45. An actuating device according to claim 44, and further comprising at least one annular sealing element arranged between the second valve element and the auxiliary valve element.

46. An actuating device according to claim 34, and further comprising at least one annular sealing element arranged between a radial outer annular cylindrical wall of the annular recess and the second valve element.

47. An actuating device according to claim 38, wherein a pressure medium channel is formed radially between the tubular portion and the auxiliary valve element and radially between the second valve element and an annular cylindrical wall of the valve housing which defines the recess, the pressure medium channel being part of the pressure medium connection inside the control valve means between the pressure medium source and the pressure medium power cylinder arrangement.

48. An actuating device according to claim 47, wherein a pressure medium connection is provided between the two pressure medium channels, whereby the pressure medium connection is interruptable in that the second valve element acts on the first application portion of the auxiliary valve element, the first application portion being associated with the second valve element, the pressure medium connection between the pressure medium channels includes at least one of at least one pressure medium through-opening which is open in the radial direction in the second valve element and an annular space defined by one of the tubular portion, the auxiliary valve element and the second valve element.

49. An actuating device according to claim 6, wherein the first valve element has an annular portion configured to encircle the tube element at least in some areas, and further comprising at least one annular sealing element arranged to act between the annular portion and the tube element in a sealing manner, the control signal is one of a hydraulic, pneumatic, electrical, an optical signal represented by a one of pressure, a volume, a force, a path, an angle, a current, a voltage and a light intensity, and further comprising converter means associated with the first signal connection for converting the control signal into the control quantity, a first valve connection connected with the pressure medium source and a second valve connection connected with the control signal transmitter, at least one of the valve connections including a radially directed bore hole in the valve housing which opens into the recess.

50. An actuating device according to claim 49, wherein both valve connections have a bore hole, the bore hole of the valve connection connected with the control signal transmitter being configured to open into a region of a base of the recess, which recess base closes the recess on one axial side, the annular portion of the first valve element serving as a piston of the converter means being located opposite the recess base, the bore hole of the valve connection connected with the pressure medium source opens into an end region of the recess, which recess end region adjoins a recess opening which opens in the axial direction.

51. An actuating device according to claim 34, and further comprising a valve connection connected with the pressure medium power cylinder arrangement, the valve connection including a first bore hole that opens into the recess and extends through the tube element, and a second bore hole that is connected to the first bore hole and extends in a base of the recess.

52. An actuating device according to claim 2, wherein the valve housing has a recess, the first valve element and the second valve element being supported in the recess of the valve housing so as to be rotatable about a valve axis, the actual quantity and the control quantity being represented by rotational positions of the respective valve element.

53. An actuating device according to claim 52, wherein one of the valve elements has an annular portion coaxial to the valve axis which at least partially encloses the other valve element of the two valve elements radially outwardly.

54. An actuating device according to claim 53, wherein the second valve element has the annular portion.

55. An actuating device according to claim 53, wherein the annular portion of the one valve element is enclosed radially outside by an inner circumferential surface of the valve housing defining the recess, the annular portion having at least two apertures which extend in the circumferential direction, are offset relative to one another in the circumferential direction, are separated from one another by a respective portion of the annular portion, and open inward radially and outward radially, the valve housing having at least two radially directed bore holes which open into the recess, the outlet openings of the bore holes being offset relative to one another in the circumferential direction and, in at least one rotational position of the one valve element, at least partially covering another of the apertures, the other valve element having at least one connection channel configured to open toward two of the apertures at least in one relative rotational position of the two valve elements relative to one another, the two outlet openings of the connection channel being at least partially covered by the respective other aperture.

56. An actuating device according to claim 55, wherein exactly three bore holes, exactly three apertures and exactly one connection channel are provided so that a first pressure medium connection is produced between the pressure medium source and the pressure medium power cylinder arrangement in at least one rotational position of the two valve elements relative to one another and relative to the valve housing via two of the bore holes, two of the apertures and the connection channel, and a second pressure medium connection is produced between the pressure medium power cylinder arrangement and the pressure compensation port in at least one other rotational position of the two valve elements relative to one another and relative to the valve housing via two of the bore holes, two of the apertures and the connection channel.

57. An actuating device according to claim 55, wherein portions of the annular portion which separate the apertures from one another are dimensioned so that in at least one of at least one relative rotational position of the two valve elements relative to one another and at least one rotational position of one of the valve elements relative to the valve housing, at least one of at least one channel opening of the connection channel in the other valve element and at least one of the outlet openings of the bore holes in the valve housing is closed by a respective portion of the annular portion, which portion forms a control edge.

58. An actuating device according to claim 57, wherein the bore holes, apertures and connection channel are arranged so that no pressure medium connection is produced between the pressure medium power cylinder arrangement and the pressure medium source, and between the pressure medium power cylinder arrangement and the pressure compensation port in at least one rotational position of the two valve elements relative to one another and relative to the valve housing.

59. An actuating device according to claim 56, wherein the outlet openings of the three bore holes are substantially not offset relative to one another in the axial direction and are arranged at a distance from one another at equal circumferential angles so as to cover a circumferential angle of equal magnitude.

60. An actuating device according to claim 56, wherein the three apertures are substantially not offset relative to one another in the axial direction and each covers a circumferential angle of equal magnitude, the apertures being arranged so as to be spaced from one another at identical circumferential angles.

61. An actuating device according to claim 59, wherein the connection channel is a radially extending through-bore hole in the first valve element, the three bore holes including a first bore hole associated with the pressure compensation port, a second bore hole associated with the pressure medium source and a third bore hole associated with the pressure medium power cylinder arrangement, the bore holes succeed one another in a predetermined circumferential direction, in a basic state of the actuating device, an outlet opening of the through-bore hole in the first valve element is located approximately opposite to the first bore hole associated with the pressure compensation port, a portion of the annular portion of the second valve element, which portion forms a control edge, is offset in the circumferential direction relative to the first bore hole associated with the pressure compensation port, but is closely adjacent thereto, the first valve element being rotatable in the circumferential direction relative to the rotational position of the basic state by a maximum of approximately up to one rotational position in which the outlet opening of the through-bore hole is located approximately opposite to the second bore hole associated with the pressure medium source, so as to actuate the clutch.

62. An actuating device according to claim 52, wherein the recess is a through-bore hole in the valve housing that extends transverse to a movement direction of the release bearing means, the first valve element being arranged to be accessible at one end of the through-bore hole, and the second valve element being arranged to be accessible at another end of the through-bore hole.

63. An actuating device according to claim 62, wherein the first valve element is arranged to project out of the one end of the through-bore hole and the second valve element is arranged to project out of the another end of the through-bore hole.

64. An actuating device according to claim 62, wherein the second valve element has an end portion that projects from the through-bore hole in the valve housing, and further comprising a yoke rigidly coupled to the end portion so as to act on one of the release bearing means and a side of the pressure medium power cylinder arrangement proximate the release bearing means, and spring means for pressing on the yoke and on the valve housing, the spring means including a leg spring arranged about the end portion and pretensioned against the end portion whereby a linear movement of one of the release bearing means and the release bearing arrangement side of the pressure medium power cylinder arrangement is transformed into a rotational movement of the second valve element via the yoke.

65. An actuating device according to claim 64, and further comprising a piston-cylinder arrangement having a piston that is movable in a direction substantially transverse to the valve axis, and still further comprising a deflecting arrangement, including a toggle lever acting on the first valve element so that a linear movement of the piston is transformed into a rotational movement of the first valve element.

66. An actuating device according to claim 52, wherein the valve housing, the first valve element and the second valve element each have surface portions that contact one another, the surface portions being at least one of sealing surfaces and sliding surfaces.

67. An actuating device according to claim 52, wherein the valve housing, the first valve element and the second valve element each have surface portions that contact one another, and further comprising sealing elements arranged between the surface portions that contact one another.

68. An actuating device according to claim 31, wherein only the first valve element and the second valve element are supported in the recess of the valve housing so as to be displaceable along the valve axis.

69. An actuating device according to claim 68, wherein one of the two valve elements has an annular portion coaxial to the valve axis which at least partially encloses the other of the two valve elements.

70. An actuating device according to claim 69, wherein the annular portion is provided in the second valve element so as to at least partially enclose the first valve element.

71. An actuating device according to claim 69, wherein one of the valve elements has an annular portion which is enclosed externally by an inner surface of the valve housing defining the recess, the annular portion having at least two apertures which extend in the axial direction, are offset relative to one another in the axial direction, are separated from one another by a respective portion of the annular portion, and are open radially inwardly and outwardly, at least two bore holes which open into the recess are arranged in the valve housing so that outlet openings of the bore holes are offset relative to one another in the axial direction and, in at least one axial position of the one valve element, cover another of the apertures at least partially, and at least one connection channel being provided in the other valve element so that the channel opens toward two of the apertures at least in one relative axial position of the two valve elements.

72. An actuating device according to claim 71, wherein exactly three bore holes, exactly three apertures and exactly one connection channel, which extends along an outside surface of the other valve element, are provided so that a first pressure medium connection is produced between the pressure medium source and the pressure medium power cylinder arrangement in at least one axial position of the two valve elements relative to one another and relative to the valve housing via two of the bore holes, two of the apertures and the connection channel, and a second pressure medium connection is produced between the pressure medium power cylinder arrangement and the pressure compensation port in at least one other axial position of the two valve elements relative to one another and relative to the valve housing via two of the bore holes, two of the apertures and the connection channel.

73. An actuating device according to claim 71, wherein the bore holes, apertures and connection channel are arranged so that no pressure medium connection is produced between the pressure medium power cylinder arrangement and the pressure medium source and between the pressure medium power cylinder arrangement and the pressure compensation port in at least one axial position of the two valve elements relative to one another and relative to the valve housing.

74. An actuating device according to claim 2, wherein the control valve means is arranged inside the housing cover so as to be externally accessible, and the housing cover is connected with the internal combustion engine and transmission.

75. An actuating device according to claim 2, wherein the friction clutch has a release direction and the pressure medium power cylinder arrangement has a release direction substantially parallel to the friction clutch release direction, the clutch axis and the axis of the power cylinder arrangement substantially coinciding.

76. An actuating device according to claim 2, wherein the valve axis and the axis of the power cylinder arrangement have no point in common.

77. An actuating device according to claim 76, wherein the valve axis and the axis of the power cylinder arrangement are substantially parallel to one another.

78. An actuating device according to claim 76, wherein the valve axis and the axis of the power cylinder arrangement are substantially orthogonal to one another in projection on a plane that is substantially parallel to both axes.

79. An actuating device according to claim 2, wherein the control valve means is detachably connected to the pressure medium power cylinder arrangement.

80. An actuating device according to claim 79, and further comprising a control valve constructional unit which includes the control valve means, and a power cylinder constructional unit that includes the pressure medium power cylinder arrangement, the control valve constructional unit being offset in a radial direction with respect to the axis of the power cylinder arrangement relative to the power cylinder constructional unit and detachably arranged at a radial outer portion of the power cylinder constructional unit.

81. An actuating device according to claim 80, wherein the control valve constructional unit is configured to be removable substantially in a radial direction from the power cylinder constructional unit.

82. An actuating device according to claim 2, wherein the pressure medium is a pneumatic pressure medium.

\* \* \* \* \*